United States Patent
Sun et al.

(10) Patent No.: US 11,310,826 B2
(45) Date of Patent: Apr. 19, 2022

(54) SIGNATURE BASED INTEGRITY CHECK DESIGN FOR DOWNLINK GRANT ERROR PROTECTION IN ENHANCED COMPONENT CARRIERS

(71) Applicant: QUALCOMM Incorporated, San Diego, CA (US)

(72) Inventors: Jing Sun, San Diego, CA (US); Taesang Yoo, Riverside, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 160 days.

(21) Appl. No.: 15/369,642

(22) Filed: Dec. 5, 2016

(65) Prior Publication Data
US 2017/0215204 A1    Jul. 27, 2017

Related U.S. Application Data

(60) Provisional application No. 62/287,216, filed on Jan. 26, 2016.

(51) Int. Cl.
*H04W 72/14* (2009.01)
*H04L 1/18* (2006.01)
(Continued)

(52) U.S. Cl.
CPC .......... *H04W 72/14* (2013.01); *H04L 1/1671* (2013.01); *H04L 1/1812* (2013.01);
(Continued)

(58) Field of Classification Search
CPC ... H04L 1/1671; H04L 1/1812; H04L 1/1864; H04L 1/1887; H04L 1/1896; H04L 5/0055; H04W 72/042; H04W 72/14
(Continued)

(56) References Cited

U.S. PATENT DOCUMENTS

2007/0297610 A1    12/2007  Chen et al.
2012/0188961 A1*    7/2012  Suzuki .............. H04W 74/0833
                                            370/329
(Continued)

FOREIGN PATENT DOCUMENTS

CN    103796327 A    5/2014
CN    103873213 A    6/2014
WO    WO-2011021878 A2 *    2/2011    .......... H04L 5/0053

OTHER PUBLICATIONS

ISA/EP, International Search Report and Written Opinion of the International Searching Authority, Int'l Application No. PCT/US2016/065178, dated Feb. 15, 2017, European Patent Office, Rijswijk, NL, 14 pgs.

(Continued)

*Primary Examiner* — Pankaj Kumar
*Assistant Examiner* — Kokou R Detse
(74) *Attorney, Agent, or Firm* — Qualcomm Incorporated

(57) ABSTRACT

Methods, systems, and devices for wireless communication are described. After receiving a transmission, a user equipment (UE) may store status information for the transmission and send an acknowledgment message that includes a signature. When a base station receives an acknowledgment message with a signature, it may transmit a subsequent downlink grant that includes the same signature. The signature included in a downlink grant may enable the UE to retrieve a stored status and decode the next data transmission based on the retrieved status. That is, the base station may use the signature in the grant to indicate which acknowledgment the grant is based on.

22 Claims, 20 Drawing Sheets

(51) Int. Cl.
*H04L 5/00* (2006.01)
*H04W 72/04* (2009.01)
*H04L 1/16* (2006.01)

(52) U.S. Cl.
CPC .......... *H04L 1/1864* (2013.01); *H04L 1/1896* (2013.01); *H04L 5/0055* (2013.01); *H04W 72/042* (2013.01); *H04L 1/1887* (2013.01)

(58) Field of Classification Search
USPC ........................................................ 370/329
See application file for complete search history.

(56) References Cited

U.S. PATENT DOCUMENTS

| | | | | |
|---|---|---|---|---|
| 2012/0257559 | A1* | 10/2012 | Kim | H04W 76/19 370/311 |
| 2014/0119195 | A1* | 5/2014 | Tofighbakhsh | H04W 52/0251 370/241 |
| 2014/0185534 | A1* | 7/2014 | Vos | H04W 72/042 370/329 |
| 2015/0043445 | A1* | 2/2015 | Xiong | H04W 76/14 370/329 |
| 2015/0110026 | A1* | 4/2015 | Lee | H04W 72/0453 370/329 |
| 2017/0215183 | A1* | 7/2017 | Gulati | H04L 1/1812 |

OTHER PUBLICATIONS

Nortel, "HARQ Process ID's for DL Persistent Scheduling," 3GPP TSG RAN WG2 Meeting #63, R2-084130/R2-083696, Jeju, Korea, Aug. 18-22, 2008, 6 pgs., XP050319272, 3rd Generation Partnership Project [retrieved on Aug. 12, 2008].

"3rd Generation Partnership Project; Technical Specification Group Radio Access Network; Physical channels and mapping of transport channels onto physical channels (FDD) (Release 11)", 3GPP TS 25.211 V11.5.0 (Jun. 2014), pp. 1-63.

European Search Report—EP21181724—Search Authority—Munich—dated Oct. 6, 2021.

* cited by examiner

SIGNATURE BASED INTEGRITY CHECK DESIGN FOR DOWNLINK GRANT ERROR PROTECTION IN ENHANCED COMPONENT CARRIERS

CROSS REFERENCES

The present Application for Patent claims priority to U.S. Provisional Patent Application No. 62/287,216 by Sun, et al., entitled "SIGNATURE BASED INTEGRITY CHECK DESIGN FOR DOWNLINK GRANT ERROR PROTECTION IN ENHANCED COMPONENT CARRIERS," filed Jan. 26, 2016, assigned to the assignee hereof, and which is hereby expressly incorporated by reference herein in its entirety.

BACKGROUND

The following relates generally to wireless communication, and more specifically to signature based integrity checking for downlink grant error protection in enhanced component carriers (eCCs).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

In some cases, data transmissions between a UE and a base station may be accompanied by control messages such as resource grants or acknowledgments. Packet loss, false positives, and other errors in communicating these control messages may result in disparities between the devices about which data is being communicated. This may result in redundant transmissions, delays, and reduced throughput.

SUMMARY

After receiving a transmission, a user equipment (UE) may store status information for the transmission and send an acknowledgment message that includes a signature. When a base station receives an acknowledgment message with a signature, it may transmit a subsequent downlink grant that includes the same signature. The signature included in a downlink grant may enable the UE to retrieve the stored status information and decode the next data transmission based on the retrieved status information. That is, the base station may use the signature in the grant to indicate which acknowledgment message the grant is based on.

A method of wireless communication is described. The method may include receiving a downlink grant, wherein the downlink grant comprises a first signature, identifying a stored first status based at least in part on the first signature, decoding a data transmission based at least in part on the downlink grant and the stored first status and transmitting an acknowledgment message for the data transmission, wherein the acknowledgment message comprises a second signature.

An apparatus for wireless communication is described. The apparatus may include means for receiving a downlink grant, wherein the downlink grant comprises a first signature, means for identifying a stored first status based at least in part on the first signature, means for decoding a data transmission based at least in part on the downlink grant and the stored first status and means for transmitting an acknowledgment message for the data transmission, wherein the acknowledgment message comprises a second signature.

A further apparatus is described. The apparatus may include a processor, memory in electronic communication with the processor, and instructions stored in the memory. The instructions may be operable to cause the processor to receive a downlink grant, wherein the downlink grant comprises a first signature, identify a stored first status based at least in part on the first signature, decode a data transmission based at least in part on the downlink grant and the stored first status and transmit an acknowledgment message for the data transmission, wherein the acknowledgment message comprises a second signature.

A non-transitory computer readable medium for wireless communication is described. The non-transitory computer-readable medium may include instructions to cause a processor to receive a downlink grant, where the downlink grant comprises a first signature, identify a stored first status based on the first signature, decode a data transmission based on the downlink grant and the stored first status and transmit an acknowledgment message for the data transmission, where the acknowledgment message comprises a second signature.

Some examples of the method, apparatus, or non-transitory computer-readable medium described above may further include processes, features, means, or instructions for storing a second status indexed with the second signature based on decoding the data transmission.

In some examples of the method, apparatus, or non-transitory computer-readable medium described above, the first status is stored in a first page of memory and the second status is stored in a second page of memory.

Some examples of the method, apparatus, or non-transitory computer-readable medium described above may further include processes, features, means, or instructions for transitioning from a hybrid automatic repeat request (HARQ) idle state to a HARQ pending state following the transmission of the acknowledgment message.

Some examples of the method, apparatus, or non-transitory computer-readable medium described above may further include processes, features, means, or instructions for transitioning from the HARQ pending state to the HARQ idle state following the receipt of the first signature.

In some examples of the method, apparatus, or non-transitory computer-readable medium described above, the first signature and the second signature are different values.

In some examples of the method, apparatus, or non-transitory computer-readable medium described above, the stored first status comprises at least one of a transport block (TB) structure, a code block (CB) identifier, or log likelihood ratio (LLR) buffer contents, where the data transmission is decoded based on the at least one of the TB structure, the CB identifier, or the LLR buffer contents for decoding the data transmission.

A method of wireless communication is described. The method may include receiving a first acknowledgment message, wherein the first acknowledgment message comprises a first signature and transmitting a downlink grant based at least in part on the first acknowledgment message, wherein the downlink grant comprises the first signature.

An apparatus for wireless communication is described. The apparatus may include means for receiving a first acknowledgment message, wherein the first acknowledgment message comprises a first signature and means for transmitting a downlink grant based at least in part on the first acknowledgment message, wherein the downlink grant comprises the first signature.

A further apparatus is described. The apparatus may include a processor, memory in electronic communication with the processor, and instructions stored in the memory. The instructions may be operable to cause the processor to receive a first acknowledgment message, wherein the first acknowledgment message comprises a first signature and transmit a downlink grant based at least in part on the first acknowledgment message, wherein the downlink grant comprises the first signature.

A non-transitory computer readable medium for wireless communication is described. The non-transitory computer-readable medium may include instructions to cause a processor to receive a first acknowledgment message, where the first acknowledgment message comprises a first signature and transmit a downlink grant based on the first acknowledgment message, where the downlink grant comprises the first signature.

Some examples of the method, apparatus, or non-transitory computer-readable medium described above may further include processes, features, means, or instructions for transmitting a data message using resources in the downlink grant. Some examples of the method, apparatus, or non-transitory computer-readable medium described above may further include processes, features, means, or instructions for receiving a second acknowledgment message comprising a second signature in response to the data message.

Some examples of the method, apparatus, or non-transitory computer-readable medium described above may further include processes, features, means, or instructions for determining that the second acknowledgment message corresponding to the downlink grant has not been received. Some examples of the method, apparatus, or non-transitory computer-readable medium described above may further include processes, features, means, or instructions for transmitting a subsequent downlink grant comprising the first signature based on the determination.

Some examples of the method, apparatus, or non-transitory computer-readable medium described above may further include processes, features, means, or instructions for transitioning from a HARQ idle state to a HARQ pending state following the transmission of the downlink grant.

Some examples of the method, apparatus, or non-transitory computer-readable medium described above may further include processes, features, means, or instructions for transitioning from the HARQ pending state to the HARQ idle state following the receipt of the acknowledgment message.

DETAILED DESCRIPTION

Wireless systems may be subject to interference and other factors that may result in unsuccessful or erroneous transmissions of control information such as downlink grants, which may lead to the loss of synchronization of a hybrid automatic repeat request (HARQ) state machine. When HARQ state machines at the transmitter and receiver become asynchronous, there will be misunderstanding on what is being transmitted during the data portion of the transmission. The error may propagate to later transmissions as well and all these will lead to failed data transmission and reduced throughput. Accordingly, these systems may use error correction methods to prevent these errors. In addition to other error correction and detection methods, a "mayday" check bit may be used to keep the transmitter and the receiver HARQ state machines in synchronization when the error events are erasure of the downlink grants or uplink acknowledgments. However, in some cases the check bit may not prevent loss of synchronization due to decoding errors or false positives in decoding control messages.

Thus, to maintain HARQ state synchronization a user equipment (UE) may also include a signature field in acknowledgment messages (e.g., ACK/NACK signals) sent to a base station. The signature may be a bit field corresponding to a transport block (TB) and may be updated each time an acknowledgment message is transmitted. A base station may verify that it received the acknowledgment message corresponding to a signature by including the same signature in a subsequent downlink grant. When the UE receives the grant, the UE may use the signature to identify which acknowledgment message the grant is based on and may process the grant and decode the corresponding downlink transmission accordingly.

Aspects of the disclosure are initially described in the context of a wireless communication system. Specific examples are then described for decoding control channels in the presence of acknowledgment message and downlink grant transmission failures. Aspects of the disclosure are further illustrated by and described with reference to apparatus diagrams, system diagrams, and flowcharts that relate to signature based integrity checking for downlink grant error protection in enhanced component carriers (eCCs).

Figure 1:
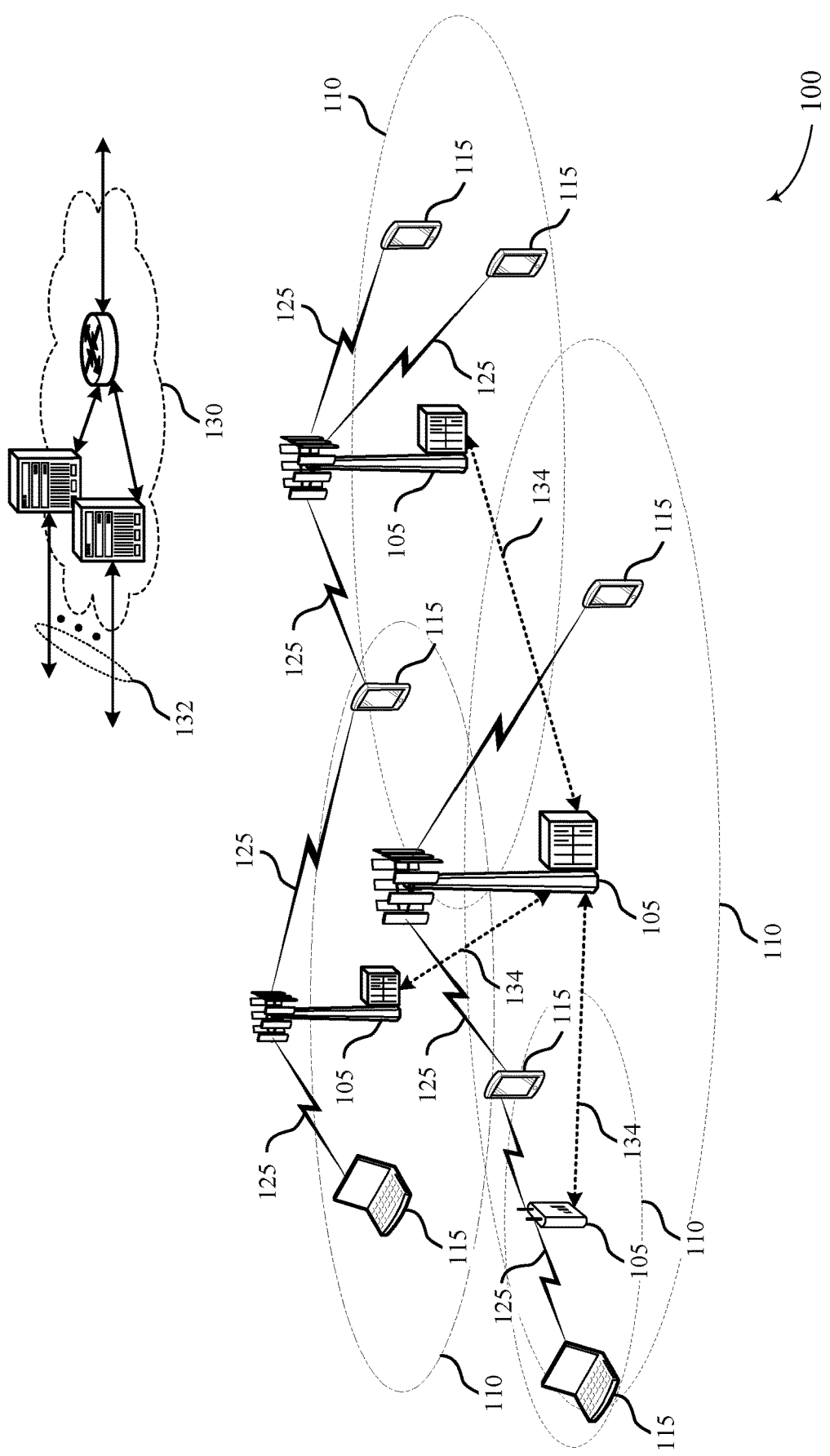
FIG. 1 illustrates an example of a wireless communications system that supports signature based integrity checking for downlink grant error protection in enhanced component carriers (eCCs) in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network, or a New Radio (NR) system (5G). Wireless communications system 100 may support HARQ state synchronization using a signature field included in downlink grants and acknowledgment messages.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

In some examples, the wireless communications system 100 may be a LTE (or LTE-Advanced) network, or a NR network. In some cases, wireless communications system 100 may support enhanced broadband communications, ultra-reliable (i.e., mission critical) communications, low latency communications, and communications with low-cost and low-complexity devices. The core network 130 may provide user authentication, access authorization, tracking, Internet Protocol (IP) connectivity, and other access, routing, or mobility functions.

Base stations 105 may wirelessly communicate with UEs 115 via one or more base station antennas. Each base station 105 may provide communication coverage for a respective geographic coverage area 110. Wireless communication links 125 shown in wireless communications system 100 may include uplink transmissions from a UE 115 to a base station 105, or downlink transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine type communication (MTC) device, etc.

Wireless systems may be subject to interference and other factors that may result in unsuccessful transmissions. For example, a base station may transmit a grant to a UE 115 indicating resources to use for a downlink transmission. If the UE 115 does not receive the grant (e.g., due to transmission interference or transmission corruption), the UE 115 may not receive the corresponding downlink transmission. If the UE 115 does receive the grant, the UE 115 may attempt to decode the corresponding downlink transmission.

Some systems may use error correction methods to prevent packet loss and loss of HARQ state synchronization. For example, each packet (i.e., each physical layer transport) may be segmented into one or more code blocks (CBs), and a number of cyclic redundancy check (CRC) bits may be appended to each CB. The CRC bits may be used to verify whether each CB was decoded properly. A wireless system may also include a check bit to mitigate downlink grant loss or uplink acknowledgment (ACK) or negative acknowledgment (NACK) loss. The check bit may indicate whether there was an error in transmission, and may help to ensure that a transmitter and a receiver are synchronized in order to determine which packet may be transmitted or retransmitted.

Blind decoding of control information may increase the probability of a decoding error. In a blind decoding operation, a UE 115 may attempt to decode one or more transmission candidates without knowing the actual location of a control message. Even with a large CRC (e.g., 20 bits) there is a small chance that the UE 115 may falsely identify a control message if the received bits pass a CRC check (i.e., a false alarm). If the UE 115 performs a large number of blind decoding operations (e.g., when the UE operates in an unlicensed band where the base station may not be guaranteed medium access to transmit control messages), the chance of a false alarm may be significant.

Base stations 105 and UEs 115 may also use HARQ to reduce packet loss. HARQ may be a method of ensuring that data is received correctly over a wireless communication link 125. HARQ may include a combination of error detection (e.g., using a CRC), forward error correction (FEC), and retransmission (e.g., automatic repeat request (ARQ)). HARQ may improve throughput at the medium access control (MAC) layer in poor radio conditions (e.g., signal-to-noise conditions). HARQ may include procedures for a UE 115 to transmit ACK/NACK to indicate whether a transmission was successfully decoded.

In Incremental Redundancy HARQ, incorrectly received data may be stored in a buffer and combined with subsequent transmissions to improve the overall likelihood of successfully decoding the data. In some cases, redundancy bits are added to each message prior to transmission, and may be useful when decoding in poor conditions. In other cases, redundancy bits are not added to each transmission, but are retransmitted after the transmitter of the original message receives a NACK indicating a failed attempt to decode the information. The chain of transmission, response and retransmission may be referred to as a HARQ process. In some cases, a limited number of HARQ processes may be used for a given wireless communication link 125. In some cases, a base station may not receive any ACK/NACK messages, and an error at any stage may result in packet loss, delay, and reduced throughput. Thus, ACK/NACK messages may also include a signature field to coordinate the state of a HARQ process between a UE 115 and a base station 105.

In some cases, a wireless communications system 100 (e.g., a LTE or NR system) may utilize one or more eCCs to improve throughput, latency, or reliability of wireless communications. An eCC may be characterized by one or more features including: flexible bandwidth, different transmission time intervals (TTIs), and modified control channel configuration. In some cases, an eCC may be associated with a carrier aggregation (CA) configuration or a dual connectivity configuration (e.g., when multiple serving cells have a suboptimal backhaul link). An eCC may also be configured for use in unlicensed spectrum or shared spectrum (e.g., where more than one operator is licensed to use the spectrum).

An eCC characterized by flexible bandwidth may include one or more segments that may be utilized by UEs 115 that are not capable of monitoring the whole bandwidth or prefer to use a limited bandwidth (e.g., to conserve power). In some cases, an eCC may utilize a different TTI length than other component carriers (CCs), which may include use of a reduced or variable symbol duration as compared with TTIs of the other CCs. The symbol duration may remain the same, in some cases, but each symbol may represent a distinct TTI. In some examples, an eCC may support transmissions using different TTI lengths. For example, some CCs may use uniform 1 ms TTIs, whereas an eCC may use a TTI length of a single symbol, a pair of symbols, or a slot.

In some cases, a shorter symbol duration may also be associated with increased subcarrier spacing. In conjunction with the reduced TTI length, an eCC may utilize dynamic time division duplex (TDD) operation (i.e., it may switch from downlink to uplink operation for short bursts according to dynamic conditions.) Flexible bandwidth and variable TTIs may be associated with a modified control channel configuration (e.g., an eCC may utilize an enhanced physical downlink control channel (ePDCCH) for downlink control information). For example, one or more control channels of an eCC may utilize frequency-division multiplexing (FDM) scheduling to accommodate flexible bandwidth use. Other control channel modifications include the use of additional control channels (e.g., for evolved multimedia broadcast multicast service (eMBMS) scheduling, or to indicate the length of variable length uplink and downlink bursts), or control channels transmitted at different intervals. An eCC may also include modified or additional HARQ related control information.

Thus, a UE 115 may transmit an acknowledgment message that includes a signature in response to a data transmission from a base station 105. The base station 105 may receive the acknowledgment message and transmit a subsequent downlink grant that includes the signature. Upon receipt of the downlink grant from the base station, the UE 115 may identify a stored first status based on the signature and decode a subsequent data transmission based on the received downlink grant and the stored first status. The UE 115 may then transmit an acknowledgment message that includes a different signature. In some cases, the UE 115 may store a second status that is indexed with the different signature based on decoding the subsequent data transmission.

Figure 2:
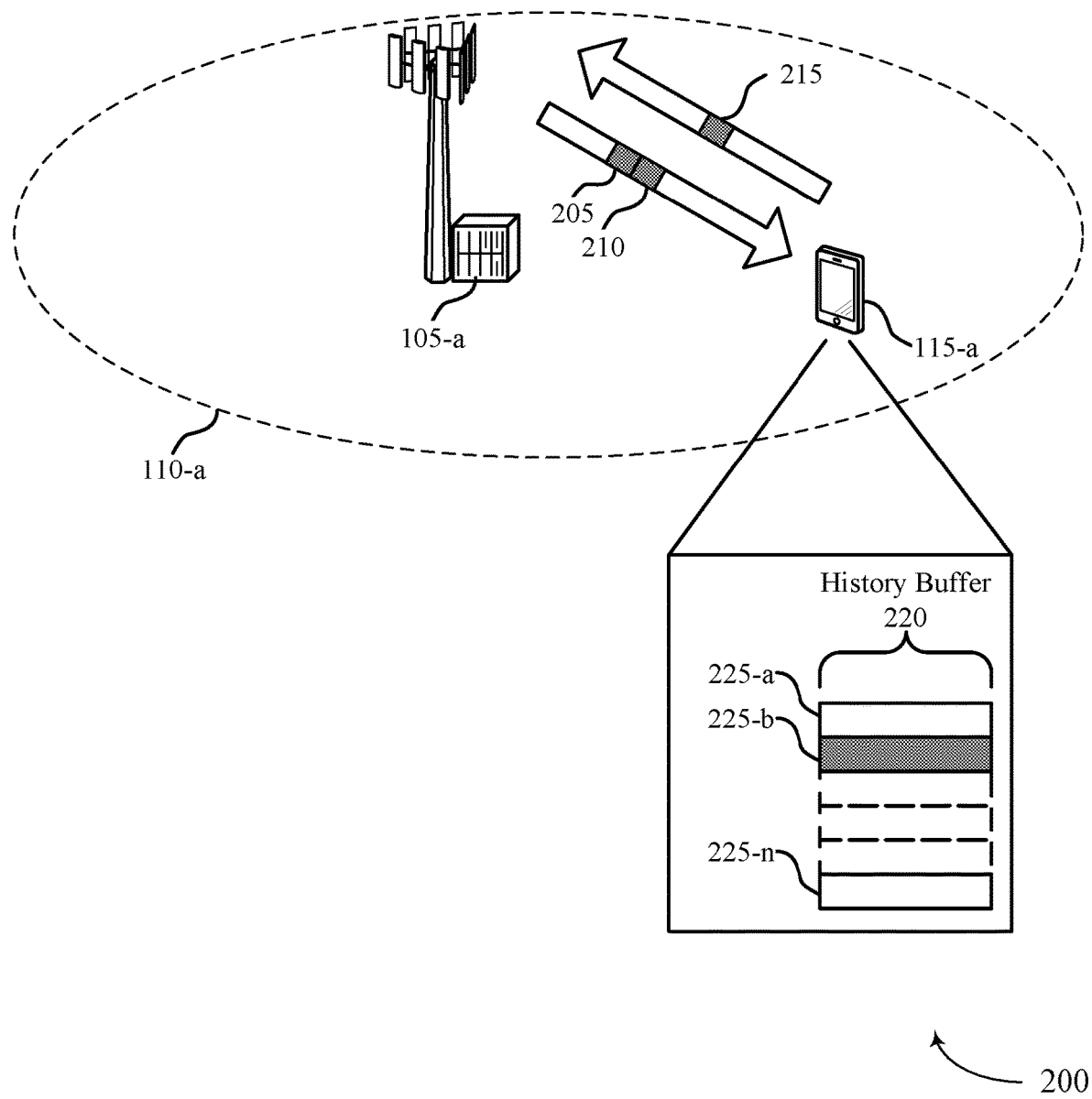
FIG. 2 illustrates an example of a wireless communications system that supports signature based integrity checking for downlink grant error protection in eCCs in accordance with aspects of the present disclosure.

FIG. 2 illustrates an example of a wireless communications system 200 for signature based integrity checking for downlink grant error protection in eCCs. Wireless communications system 200 may include base station 105-a and UE 115-a, which may be examples of the corresponding devices described with reference to FIG. 1. Wireless communications system 200 may support HARQ state synchronization using a signature field included in downlink grants and acknowledgment messages.

When communicating a number of TBs, UE 115-a may be in one of two synchronization states with regard to each TB. The first state may be an idle, or static, mode. In the idle mode, UE 115-a may not have any current data transactions pending. However, after receiving a downlink grant 205 and a downlink transmission 210, UE 115-a may transmit an ACK/NACK 215 and transition into the second state, a pending state. In the pending state, UE 115-a may have a data transaction pending. That is, UE 115-a has sent the ACK/NACK 215 for a TB, but base station 105-a may not have yet indicated base station 105-a has received the ACK/NACK 215. After receiving a confirmation that base station 105-a has received the ACK/NACK 215, UE 115-a may return to the idle mode.

Similarly, base station 105-a may generally operate in two states. The first base station state may also be an idle, or static, mode. In the idle mode, base station 105-a may not have an ongoing data transaction. Upon transmitting the downlink grant 205, base station 105-a may transition from the idle mode into a pending mode (the second state). If base station 105-a operates in the pending mode, base station 105-a may be waiting for a transmission acknowledgment (i.e., the ACK/NACK 215). Upon receiving the ACK/NACK 215 from UE 115-a, base station 105-a may transition back into the idle mode.

To maintain HARQ state synchronization, UE 115-a may include a signature in the ACK/NACK 215. The signature may be a bit field, which may correspond to a TB and may be updated each time an ACK/NACK 215 is transmitted. The inclusion of the signature in the ACK/NACK 215 may enable UE 115-a and base station 105-a to identify a pending TB. The signature and corresponding information, such as a TB structure, a CB identifier, or a log-likelihood ratio from a decoding, may be stored in memory. The stored signature and transmission information may be referred to as a history buffer 220. The history buffer 220 may have as many pages 225 as there are possible signature combinations. For example, for an n bit signature, there may be $2^n$ pages, or entries, in the history buffer 220. The indices of the history buffer 220 may be indexed by the signature field. For example, in a 2-bit signature field, the first page 225-a of the history buffer 220 may be indexed by signature field [00], and so on.

Base station 105-a may verify that base station 105-a received the ACK/NACK 215 corresponding to a signature by including the signature in the next downlink grant 205. When UE 115-a receives the downlink grant 205, UE 115-a may first interpret the signature to identify the ACK/NACK 215 the downlink grant 205 is based on, and which page 225 of the history buffer 220 may be used as the starting point for the downlink grant 205. After loading the page 225 indexed by the signature field, UE 115-a may process the downlink grant 205 and decode the downlink transmission 210 accordingly. UE 115-a may transition from pending mode to idle mode upon receiving the downlink grant 205 with the pending signature.

If the signature from downlink grant 205 does not match a page 225 in the history buffer 220, it may be an indication of a transmission failure. For example, a mismatch may indicate a missed ACK/NACK 215 transmission, a missed downlink grant 205, or a false alarm grant due to decoding an incorrect CRC. Identifying the mismatch may prevent a loss of HARQ state synchronization between UE 115-a and base station 105-a. The number of pages 225 in the history buffer 220 may determine the number of consecutive false alarms or transmission errors that may be protected against. That is, a history depth (i.e., number of pages) of K may protect against K−1 consecutive errors.

Figure 3:
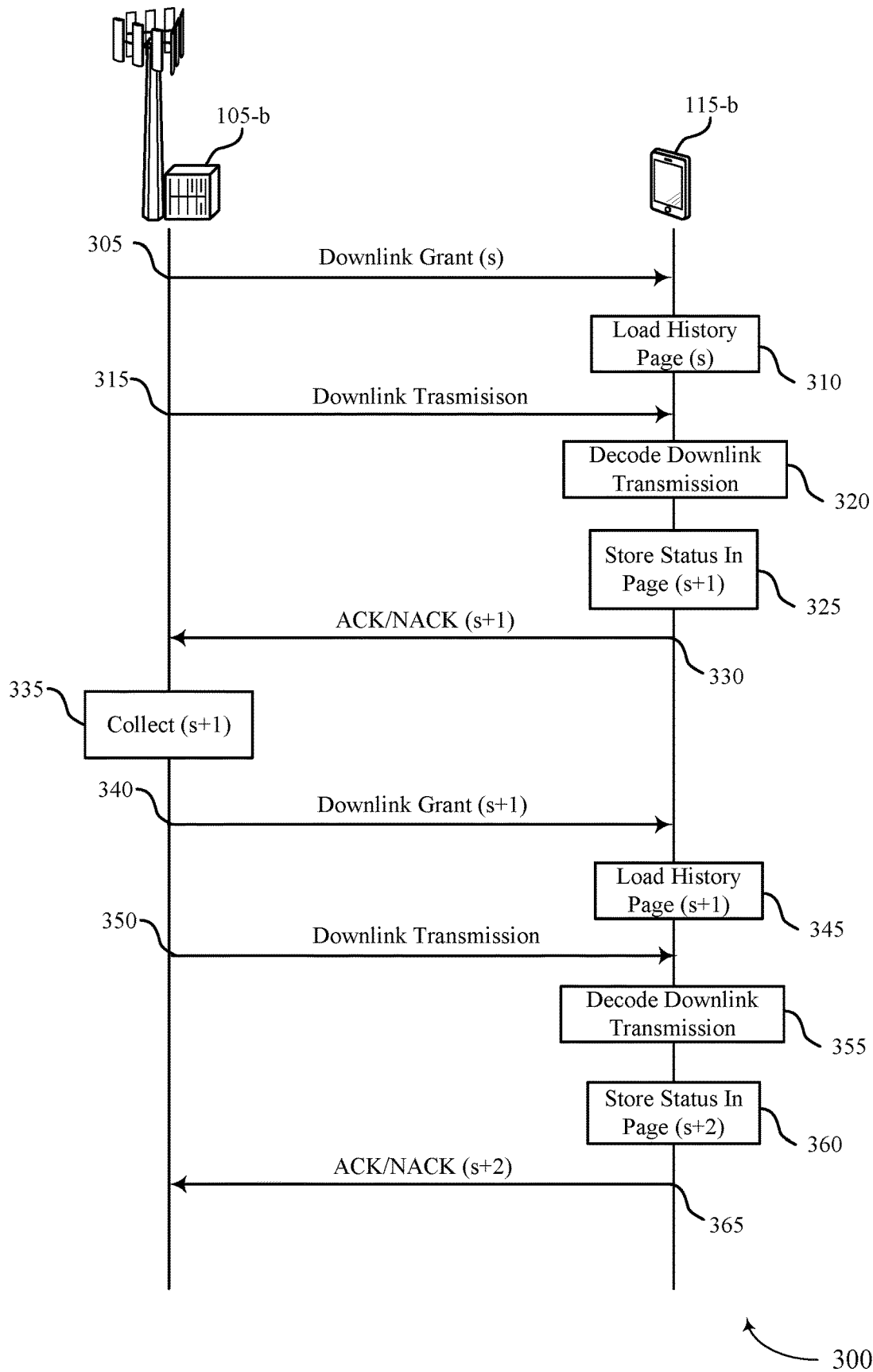
FIGS. 3 through 6 illustrate examples of process flow in a system that supports signature based integrity checking for downlink grant error protection in eCCs in accordance with aspects of the present disclosure.

FIG. 3 illustrates an example of a process flow 300 in a system that supports signature based integrity checking for downlink grant error protection in eCCs. In some cases, process flow 300 may represent aspects of techniques performed by a UE 115 or base station 105 as described with reference to FIGS. 1 and 2. Process flow 300 may support efficient control channel decoding using the transmission of signatures associated with acknowledgment messages.

To begin, base station 105-b may send a downlink grant 305 to UE 115-b. Base station 105-b may include signature "s" with the downlink grant. The signature may be an example of a signature as described with reference to FIG. 2. At block 310, UE 115-b may load a page from a history buffer indexed by the signature field in the downlink grant. The page may include a status, where the status may include at least one of a TB structure, a CB identifier, or log likelihood ratio (LLR) buffer contents.

After UE 115-b receives the downlink grant 305, base station 105-b may send a downlink transmission 315 to UE 115-b. The downlink transmission 315 may be transmitted based on resources indicated by the downlink grant 305. At block 320, UE 115-b may attempt to decode the downlink transmission based on the status loaded from the history buffer page. At block 325, UE 115-b may store downlink transmission information (e.g., TB structure, a cell block list, or LLR information) as a status in memory, for example in the history buffer on an available page, for example the page indexed by "s+1." The status may be based on decoding the downlink transmission.

UE 115-b may then send an acknowledgment message (i.e. an ACK/NACK signal 330) to base station 105-b. UE 115-b may include a signature "s+1" with the ACK/NACK signal 330. In some cases, UE 115-b may go into a pending mode upon sending the ACK/NACK signal 330. Base station 105-b may enter an idle mode upon receiving the ACK/NACK signal 330. At block 335, base station 105-b receives the ACK/NACK, and base station 105-b may collect the signature "s+1." Base station 105-b may include the signature "s+1" in a downlink grant 340 transmitted to UE 115-b.

At block 345, UE 115-b may load a page of the history buffer as indicated by the signature field included in the downlink grant. UE 115-b may load a status from the page "s+1." The status may include, for example, a TB structure, a CB identifier, or LLR buffer contents. These contents may be based on the status stored by UE 115-b at block 325. The base station 105-b may then send a downlink transmission 350 to UE 115-b on resources indicated by the downlink grant. At block 355, UE 115-b may attempt to decode the downlink transmission 350 based on the status loaded from the history buffer.

At block 360, UE 115-b may store a status including transmission information, (e.g., TB group information, CB information such as a CB identifier, or LLR buffer contents) in the history buffer at the next available page, for example the page "s+2." UE 115-b may then send an ACK/NACK signal 365 with the signature "s+2" to base station 105-b. In some cases, UE 115-b may go into an pending mode upon transmitting the ACK/NACK signal 365.

Figure 4:
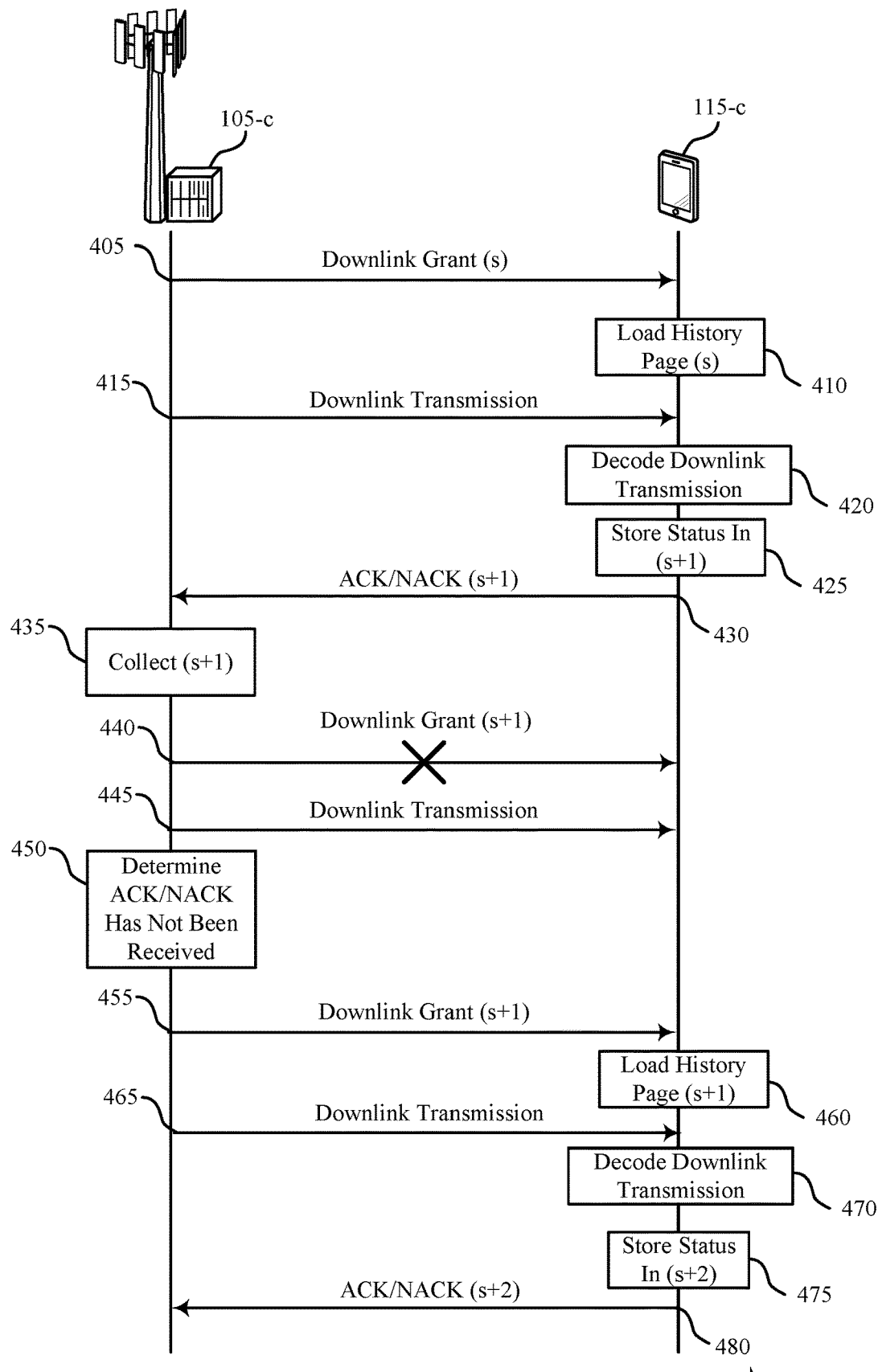

FIG. 4 illustrates an example of a process flow 400 in a system that supports signature based integrity checking for downlink grant error protection in eCCs. In some cases, process flow 400 may represent aspects of techniques performed by a UE 115 or base station 105 as described with reference to FIGS. 1 and 2. Process flow 400 may support techniques for control channel decoding in the presence of downlink grant transmission failures.

The process flow 400 begins with base station 105-c sending a downlink grant 405 to UE 115-c. A signature "s" may be included with the downlink grant 405. The signature may be an example of a signature as described with reference to FIG. 2. UE 115-c may use the signature to load a page "s" of a history buffer at block 410. UE 115-c may load a status including, for example, a TB structure, a CB identifier, or LLR buffer contents from the history buffer page indexed by "s." Upon receiving the downlink grant 405, UE 115-c may receive a downlink transmission 415 from base station 105-c on resources indicated by the downlink grant 405.

At block 420 UE 115-c may attempt to decode the downlink transmission based on the status loaded from the history buffer page indexed by signature "s." At block 425, UE 115-c may store information related to the downlink transmission 415 (e.g., a TB structure, CB identifier, or LLR buffer contents) in the history buffer at the next available page, for example at the page "s+1."

UE 115-c may then send an ACK/NACK signal 430 to base station 105-b. UE 115-c may include a signature "s+1" with the ACK/NACK signal 430. If base station 105-c receives the ACK/NACK signal 430, base station 105-c may collect the signature "s+1" at block 435. Base station 105-c may attempt to transmit a downlink grant 440 to UE 115-c. The downlink grant may include a signature "s+1." UE 115-c may not receive the downlink grant 440 due to interference, other disturbances, etc.

However, base station 105-c may not determine if UE 115-c correctly received the downlink grant, and may attempt to send the downlink transmission 445 corresponding to downlink grant 440 to UE 115-c. After a period of time, base station 105-c may determine that base station 105-c has not received an ACK/NACK signal from UE 115-c at block 450. Base station 105-c may accordingly transmit another downlink grant 455 with signature "s+1."

If UE 115-c receives the new downlink grant 455, UE 115-c may use the signature "s+1" to load the corresponding page of the history buffer at block 460. UE 115-c may load a status including, for example, a TB structure, a CB identifier, or LLR buffer contents from the history buffer page indexed by the signature "s+1." Base station 105-c may then send a downlink transmission 465 on the resources indicated by the downlink grant 455 to UE 115-c. At block 470, UE 115-c may decode the downlink transmission based on the status loaded from the history buffer.

At block 475, UE 115-c may store a status in the next available page of the history buffer, for example page "s+2" in the history buffer. The status may include transmission information related to the downlink transmission such as a TB structure, a CB identifier, or LLR buffer contents. UE 115-c may then send an ACK/NACK signal 480 with the signature "s+2" to base station 105-c.

Figure 5:
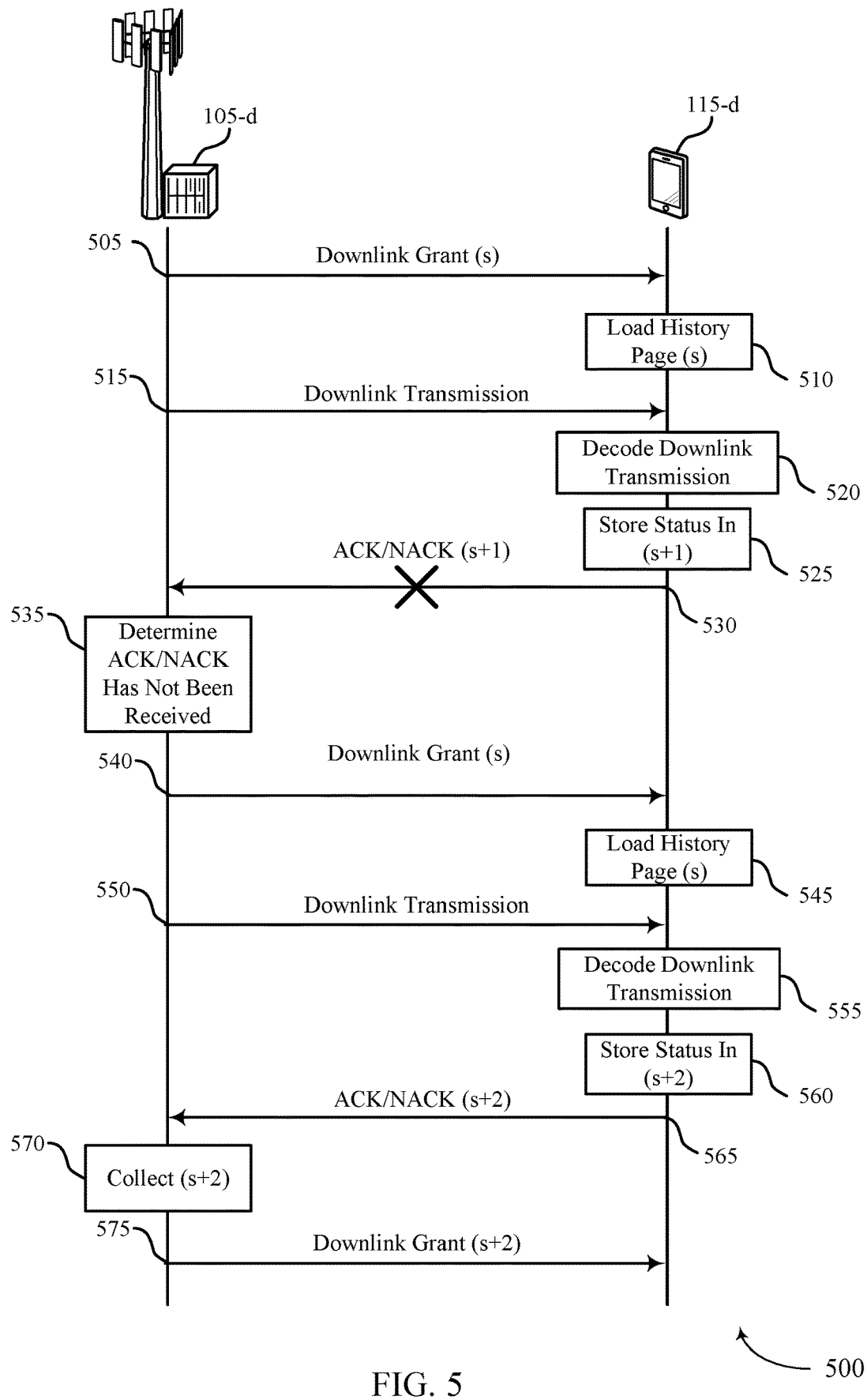

FIG. 5 illustrates an example of a process flow 500 in a system that supports signature based integrity checking for downlink grant error protection in eCCs. In some cases, process flow 500 may represent aspects of techniques performed by a UE 115 or base station 105 as described with reference to FIGS. 1 and 2. Process flow 500 may support control channel decoding in the presence of acknowledgment message transmission failures.

Process flow 500 begins with base station 105-d sending a downlink grant 505 with signature "s" to UE 115-d. At block 510, UE 115-d may use the signature to load a status from a page of the history buffer indexed by the signature. The status may include transmission information (e.g., a TB group structure, CB information such as a CB identifier, or LLR buffer contents) related to the downlink grant 505.

Base station 105-d may then send a downlink transmission 515 to UE 115-d. At block 520, UE 115-d may attempt to decode the downlink transmission 515 using the status loaded from the history buffer indexed at page "s" at block 520. UE 115-d may then store a status related to the decoded downlink transmission 515 at block 525. UE 115-d may store the status in the next available page of the history buffer, for example page "s+1." The status may include, for example, a TB structure, a CB identifier, or LLR buffer contents.

UE 115-d may then attempt to transmit an ACK/NACK signal 530 to base station 105-d. In some cases, the ACK/NACK signal 530 may not be received by the base station 105-d due to interference or other issues. At block 535, base station 105-d may determine that base station 105-d has not received an ACK/NACK signal 530 from UE 115-d for the downlink transmission 515. Base station 105-d may then transmit another downlink grant 540 with signature "s". UE 115-d may load a status from the history buffer page indexed with the signature "s" at block 545.

Base station 105-d may then send a downlink transmission 550 to UE 115-d on the resources indicated by the downlink grant 540 with signature "s." At block 555, UE 115-d may attempt to decode the downlink transmission 550 based on the status loaded from the history buffer indexed at page "s." At block 560, UE 115-d may store a status in the next available page in the history buffer, for example "s+2." The status may include a TB structure, a CB identifier, or LLR buffer contents.

UE 115-d may send an ACK/NACK signal 565 to base station 105-d. The ACK/NACK signal 565 may include a signature "s+2," which may correspond to the status based on the downlink transmission decoded in block 555. At block 570, base station 105-d may collect the signature "s+2." Base station 105-d may then use the collected signature "s+2" to send a new downlink grant 575.

Figure 6:
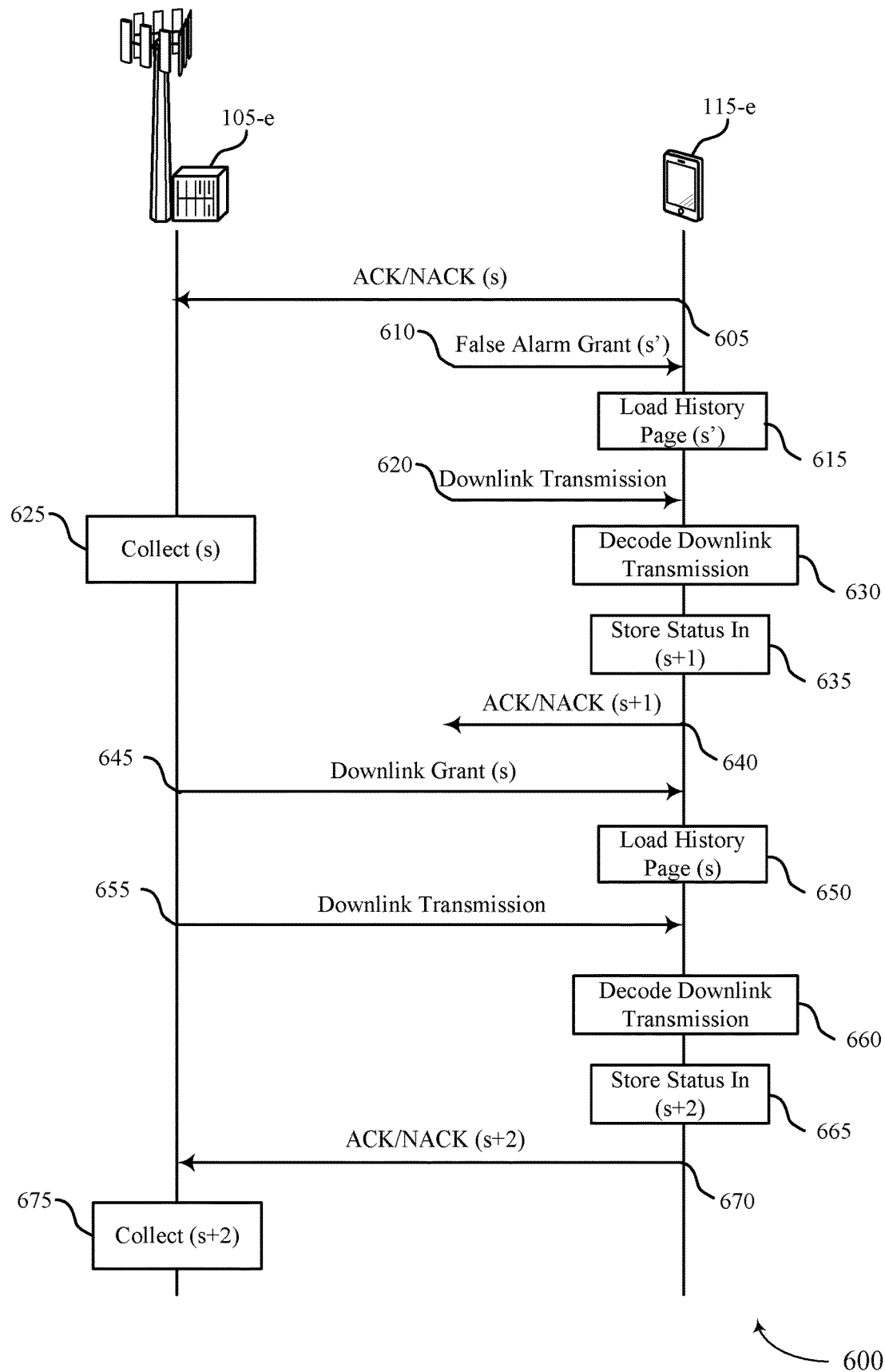

FIG. 6 illustrates an example of a process flow 600 in a system that supports signature based integrity checking for downlink grant error protection in eCCs in accordance with various aspects of the present disclosure. Process flow 600 may include base station 105-e and UE 115-e, which may be examples of the corresponding devices described with reference to FIGS. 1 and 2. Process flow 600 may support techniques for the correction of false flag transmissions.

The process flow 600 begins with UE 115-e transmitting an ACK/NACK signal 605 with a signature "s" to base station 105-e. The ACK/NACK signal 605 may be in response to a downlink transmission as described with reference to, for example, the process flow 300 of FIG. 3 up to block 325. Following transmission of the ACK/NACK signal 605, UE 115-e may receive a false alarm grant 610 with a signature "s'." The false alarm grant 610 may be, for example, based on decoding a transmission not directed at UE 115-e for which a CRC happens to succeed. At block 615, UE 115-e may load a status from a history buffer page indexed by signature "s'."

UE 115-e may also receive a downlink transmission 620 corresponding to the false alarm grant 610. At block 625, base station 105-e may collect the signature "s" from the ACK/NACK signal 605. Block 625 may occur anytime between UE 115-e sending the ACK/NACK and base station 105-e sending a downlink grant with the signature "s."

At block 630, UE 115-e may attempt to decode the downlink transmission 620 corresponding to the false alarm grant 610. UE 115-e may use the status loaded from the history buffer page indexed by signature "s'" to decode the downlink transmission 620. At block 635, UE 115-e may store another status containing information related to the downlink transmission, for example a TB structure, a CB identifier, or LLR buffer contents, in the next available history buffer page (e.g., page "s+1").

UE 115-e may then send an ACK/NACK signal 640 in response to the downlink transmission 620 associated with the false alarm grant 610, the ACK/NACK signal 640 containing signature "s+1." Base station 105-e may not receive this ACK/NACK signal 640 because base station 105-e is not expecting an ACK/NACK signal 640 from UE 115-e corresponding to the false alarm grant 610. Base station 105-e may send a new downlink grant 645 with signature "s" in response to the ACK/NACK signal 605 with signature "s."

At block 650, UE 115-e may load a status from the history buffer page indexed by signature "s." The status may include, for example, a TB structure, a CB identifier, or LLR buffer contents. Base station 105-e may then send a downlink transmission 655 to UE 115-e on the resources indicated by the downlink grant with signature "s." At block 660, UE 115-e may decode the downlink transmission 655 using the status loaded from the history buffer page indexed by the signature "s."

At block 665, UE 115-e may store a status associated with the downlink transmission 655 information in the next available page of the history buffer, for example the page indexed by "s+2." UE 115-e may then send an ACK/NACK signal 670 in response to the downlink transmission 655 to base station 105-e. The ACK/NACK signal 670 may include the signature "s+2." If base station 105-e receives the ACK/NACK signal 670, base station 105-e may collect signature "s+2" for future downlink grant transmissions at block 675.

Figure 7:
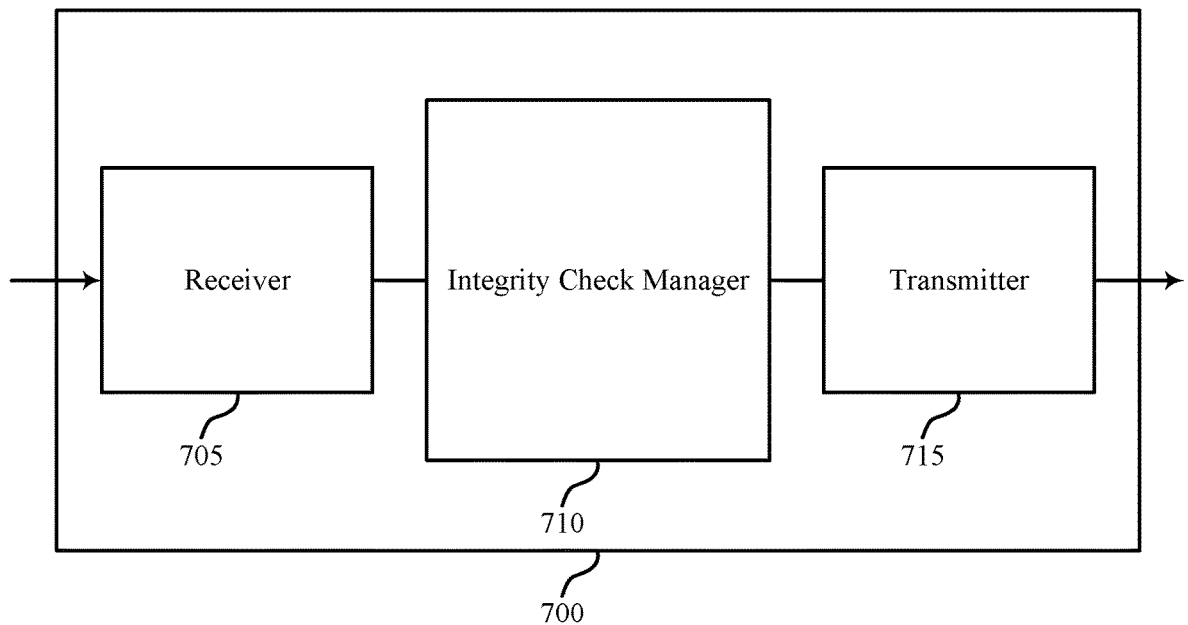
FIGS. 7 through 9 show block diagrams of a wireless device that supports signature based integrity checking for downlink grant error protection in eCCs in accordance with aspects of the present disclosure.

FIG. 7 shows a block diagram of a wireless device 700 that supports signature based integrity checking for downlink grant error protection in eCCs in accordance with various aspects of the present disclosure. Wireless device 700 may be an example of aspects of a UE 115 described with reference to FIGS. 1 and 2. Wireless device 700 may include receiver 705, integrity check manager 710 and transmitter 715. Wireless device 700 may also include a processor. Each of these components may be in communication with each other.

The receiver 705 may receive information such as packets, user data, or control information associated with various information channels (e.g., control channels, data channels, and information related to signature based integrity checking for downlink grant error protection in eCCs, etc.). Information may be passed on to other components of the device. The receiver 705 may be an example of aspects of the transceiver 1025 described with reference to FIG. 10.

The integrity check manager 710 may receive a downlink grant, where the downlink grant includes a first signature, identify a stored first status based on the first signature, decode a data transmission based on the downlink grant and the stored first status, and transmit an acknowledgment message for the data transmission, where the acknowledgment message includes a second signature. The integrity check manager 710 may also be an example of aspects of the integrity check manager 1005 described with reference to FIG. 10.

The transmitter 715 may transmit signals received from other components of wireless device 700. In some examples, the transmitter 715 may be collocated with a receiver in a transceiver module. For example, the transmitter 715 may be an example of aspects of the transceiver 1025 described with reference to FIG. 10. The transmitter 715 may include a single antenna, or it may include a plurality of antennas.

Figure 8:
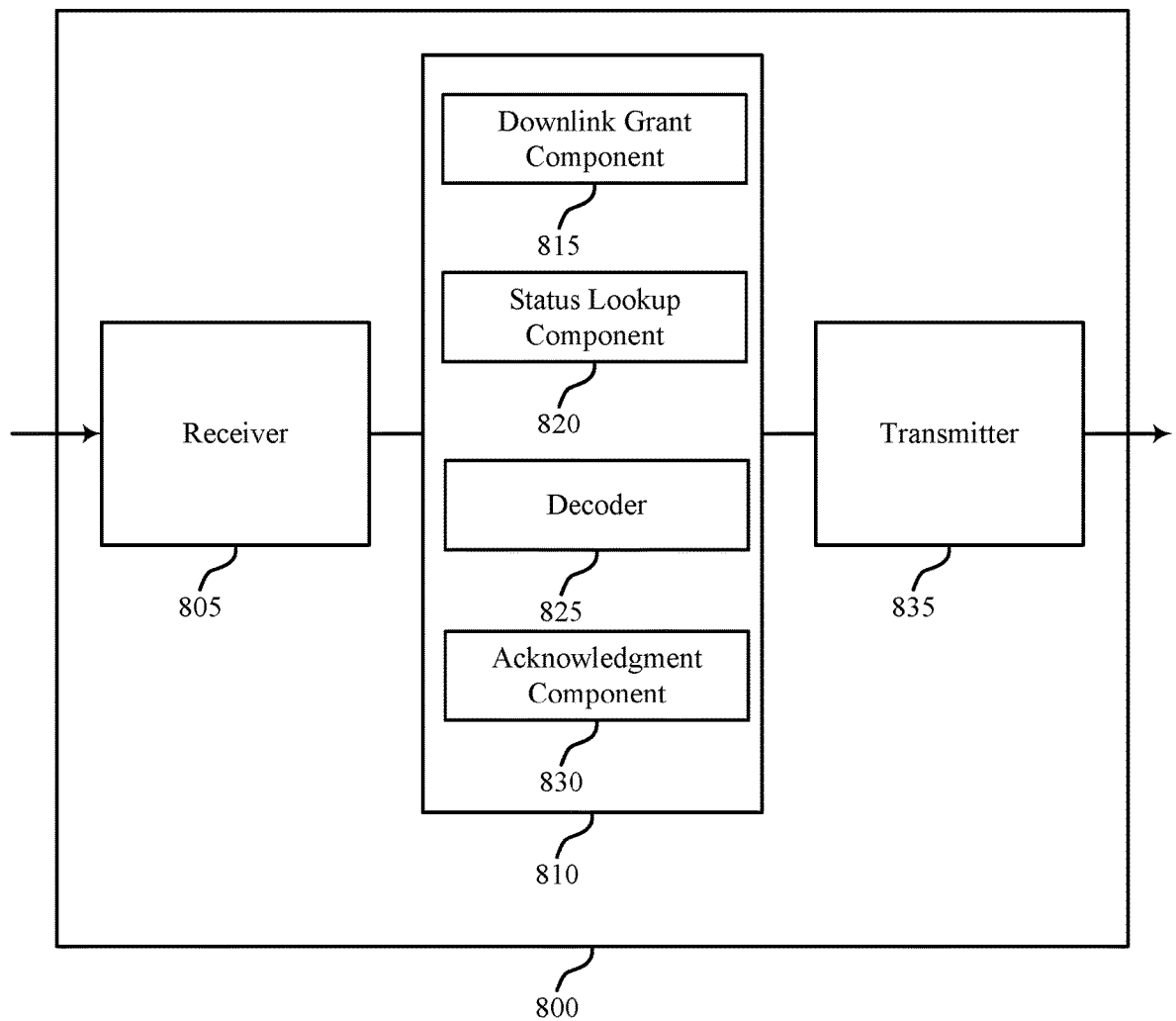

FIG. 8 shows a block diagram of a wireless device 800 that supports signature based integrity checking for downlink grant error protection in eCCs in accordance with various aspects of the present disclosure. Wireless device 800 may be an example of aspects of a wireless device 700 or a UE 115 described with reference to FIGS. 1, 2 and 7. Wireless device 800 may include receiver 805, integrity check manager 810 and transmitter 835. Wireless device 800 may also include a processor. Each of these components may be in communication with each other.

The receiver 805 may receive information which may be passed on to other components of the device. The receiver 805 may also perform the functions described with reference to the receiver 705 of FIG. 7. The receiver 805 may be an example of aspects of the transceiver 1025 described with reference to FIG. 10. The integrity check manager 810 may be an example of aspects of the integrity check manager 710 described with reference to FIG. 7. The integrity check manager 810 may include downlink grant component 815, status lookup component 820, decoder 825 and acknowledgment component 830. The integrity check manager 810 may be an example of aspects of the integrity check manager 1005 described with reference to FIG. 10.

The downlink grant component 815 may receive a downlink grant, where the downlink grant includes a first signature. The status lookup component 820 may identify a stored first status based on the first signature. In some cases, the stored first status includes at least one of a transport block structure, a CB identifier, or LLR buffer contents, where the data transmission is decoded based on the at least one of the TB structure, the CB identifier, or the LLR buffer contents for decoding the data transmission.

The decoder 825 may decode a data transmission based on the downlink grant and the stored first status. The acknowledgment component 830 may transmit an acknowledgment message for the data transmission, where the acknowledgment message includes a second signature. In some cases, the first signature and the second signature are different values.

The transmitter 835 may transmit signals received from other components of wireless device 800. In some examples, the transmitter 835 may be collocated with a receiver in a transceiver module. For example, the transmitter 835 may be an example of aspects of the transceiver 1025 described with reference to FIG. 10. The transmitter 835 may utilize a single antenna, or it may utilize a plurality of antennas.

Figure 9:
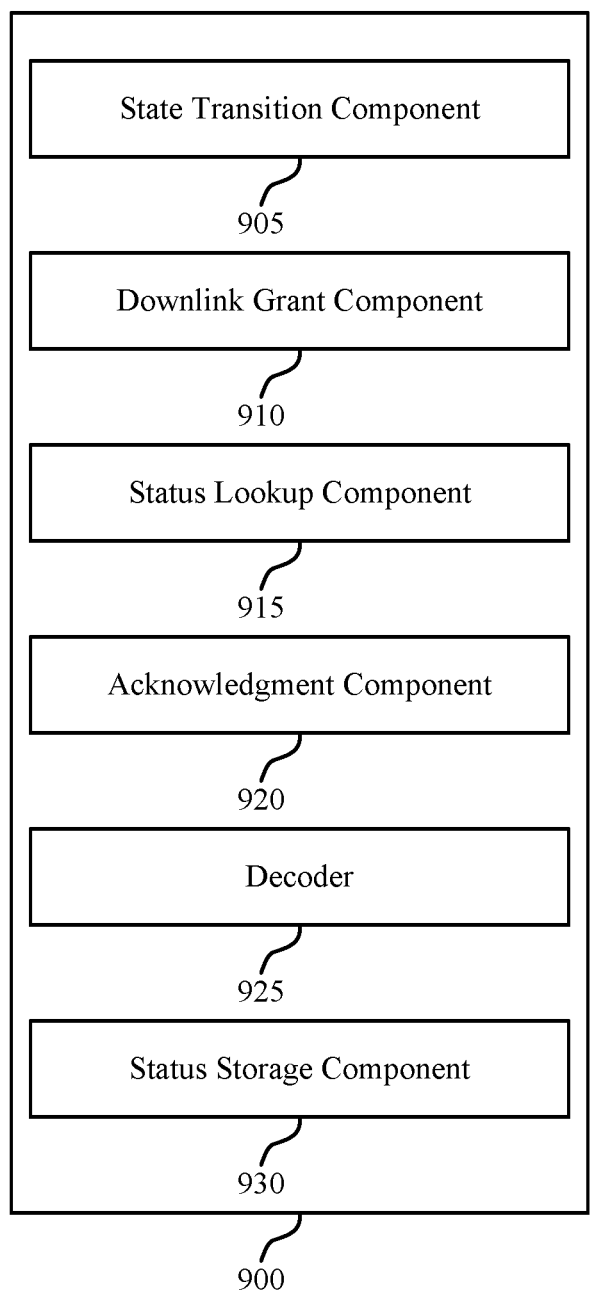

FIG. 9 shows a block diagram of an integrity check manager 900 which may be an example of the corresponding component of wireless device 700 or wireless device 800. That is, integrity check manager 900 may be an example of aspects of integrity check manager 710 or integrity check manager 810 described with reference to FIGS. 7 and 8. The integrity check manager 900 may also be an example of aspects of the integrity check manager 1005 described with reference to FIG. 10.

The integrity check manager 900 may include state transition component 905, downlink grant component 910, status lookup component 915, acknowledgment component 920, decoder 925 and status storage component 930. Each of these modules may communicate, directly or indirectly, with one another (e.g., via one or more buses).

The state transition component 905 may transition from a HARQ idle state to a HARQ pending state following the transmission of the acknowledgment message, and transition from the HARQ pending state to the HARQ idle state following the receipt of the first signature. The downlink grant component 910 may receive a downlink grant, where the downlink grant includes a first signature.

The status lookup component 915 may identify a stored first status based on the first signature. In some cases, the stored first status includes at least one of a TB structure, a CB identifier, or LLR buffer contents, where the data transmission is decoded based on the at least one of the TB structure, the CB identifier, or the LLR buffer contents.

The acknowledgment component 920 may transmit an acknowledgment message for the data transmission, where the acknowledgment message includes a second signature. In some cases, the first signature and the second signature are different values. The decoder 925 may decode a data transmission based on the downlink grant and the stored first status. The status storage component 930 may store a second status indexed with the second signature based on decoding the data transmission. In some cases, the first status is stored in a first page of memory and the second status is stored in a second page of memory.

Figure 10:
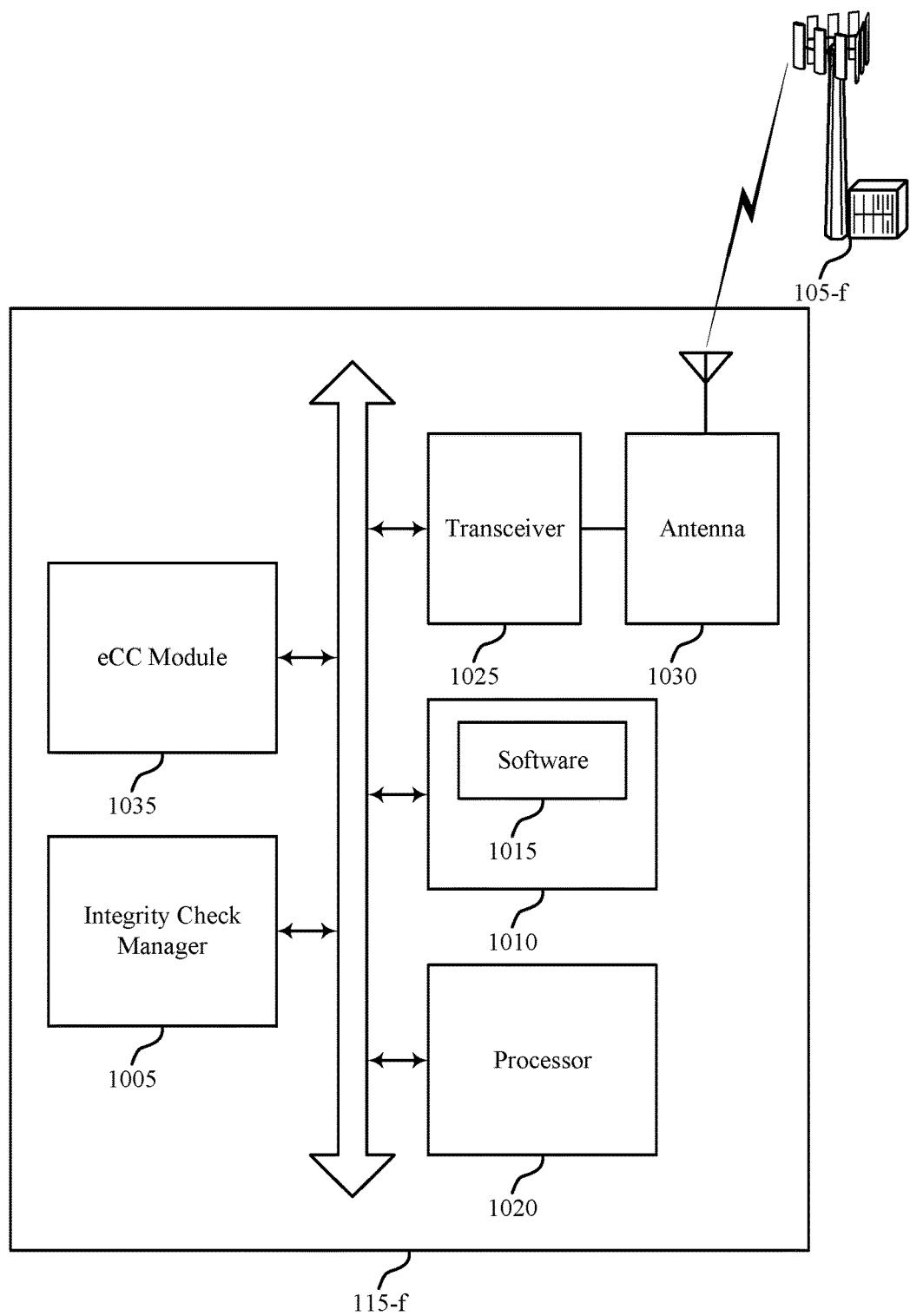
FIG. 10 illustrates a block diagram of a system including a UE that supports signature based integrity checking for downlink grant error protection in eCCs in accordance with aspects of the present disclosure.

FIG. 10 shows a diagram of a system 1000 including a device that supports signature based integrity checking for downlink grant error protection in eCCs in accordance with various aspects of the present disclosure. For example, system 1000 may include UE 115-$f$, which may be an example of a wireless device 700, a wireless device 800, or a UE 115 as described with reference to FIGS. 1, 2 and 7 through 9.

UE 115-$f$ may also include integrity check manager 1005, memory 1010, processor 1020, transceiver 1025, antenna 1030 and eCC module 1035. Each of these modules may communicate, directly or indirectly, with one another (e.g., via one or more buses). The integrity check manager 1005 may be an example of an integrity check manager as described with reference to FIGS. 7 through 9.

The memory 1010 may include random access memory (RAM) and read only memory (ROM). The memory 1010 may store computer-readable, computer-executable software including instructions that, when executed, cause the processor to perform various functions described herein (e.g., signature based integrity checking for downlink grant error protection in eCCs, etc.). In some cases, the software 1015 may not be directly executable by the processor but may cause a computer (e.g., when compiled and executed) to perform functions described herein. The processor 1020 may include an intelligent hardware device (e.g., a central processing unit (CPU), a microcontroller, an application specific integrated circuit (ASIC), etc.).

The transceiver 1025 may communicate bi-directionally, via one or more antennas, wired, or wireless links, with one or more networks, as described above. For example, the transceiver 1025 may communicate bi-directionally with a base station 105 or a UE 115. The transceiver 1025 may also include a modem to modulate the packets and provide the modulated packets to the antennas for transmission, and to demodulate packets received from the antennas.

In some cases, the wireless device may include a single antenna 1030. However, in some cases the device may have more than one antenna 1030, which may be capable of concurrently transmitting or receiving multiple wireless transmissions.

The eCC module 1035 may enable operations using eCCs such as communication using shared or unlicensed spectrum, using reduced TTIs or subframe durations, or using a large number of CCs.

Figure 11:
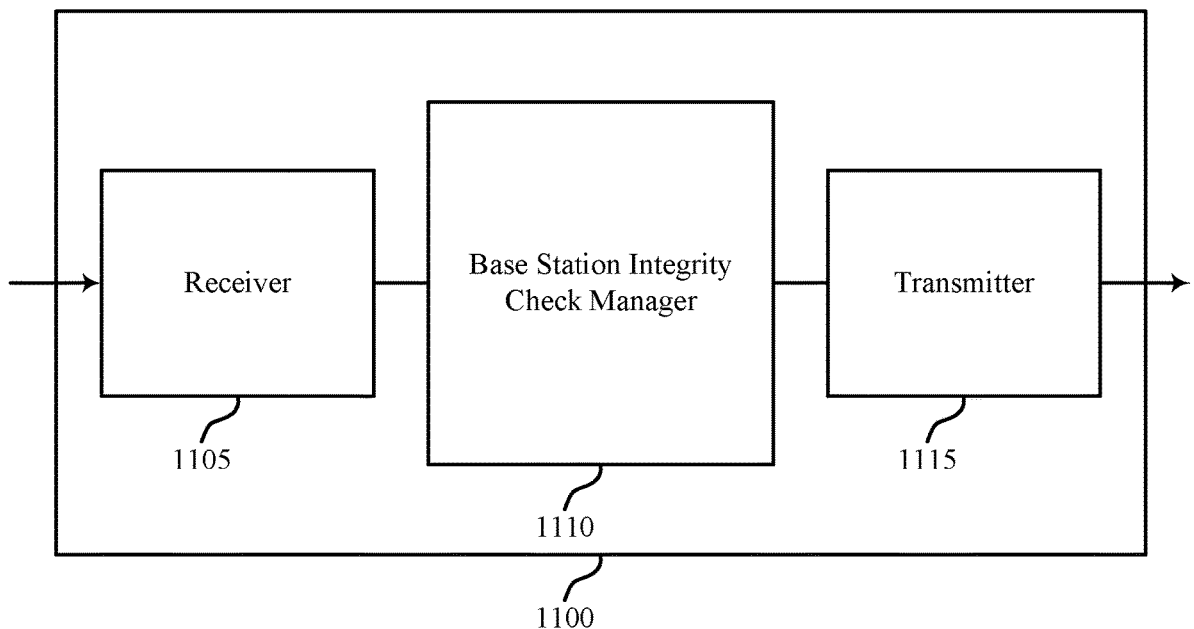
FIGS. 11 through 13 show block diagrams of a wireless device that supports signature based integrity checking for downlink grant error protection in eCCs in accordance with aspects of the present disclosure.

FIG. 11 shows a block diagram of a wireless device 1100 that supports signature based integrity checking for downlink grant error protection in eCCs in accordance with various aspects of the present disclosure. Wireless device 1100 may be an example of aspects of a base station 105 described with reference to FIGS. 1 and 2. Wireless device 1100 may include receiver 1105, base station integrity check manager 1110 and transmitter 1115. Wireless device 1100 may also include a processor. Each of these components may be in communication with each other.

The receiver 1105 may receive information such as packets, user data, or control information associated with various information channels (e.g., control channels, data channels, information related to signature based integrity checking for downlink grant error protection in eCCs, etc.). Information may be passed on to other components of the device. The receiver 1105 may be an example of aspects of the transceiver 1425 described with reference to FIG. 14.

The base station integrity check manager 1110 may receive a first acknowledgment message, where the first acknowledgment message includes a first signature, and transmit a downlink grant based on the first acknowledgment message, where the downlink grant includes the first signature. The base station integrity check manager 1110 may also be an example of aspects of the base station integrity check manager 1405 described with reference to FIG. 14.

The transmitter 1115 may transmit signals received from other components of wireless device 1100. In some examples, the transmitter 1115 may be collocated with a receiver in a transceiver module. For example, the transmitter 1115 may be an example of aspects of the transceiver 1425 described with reference to FIG. 14. The transmitter 1115 may include a single antenna, or it may include a plurality of antennas.

Figure 12:
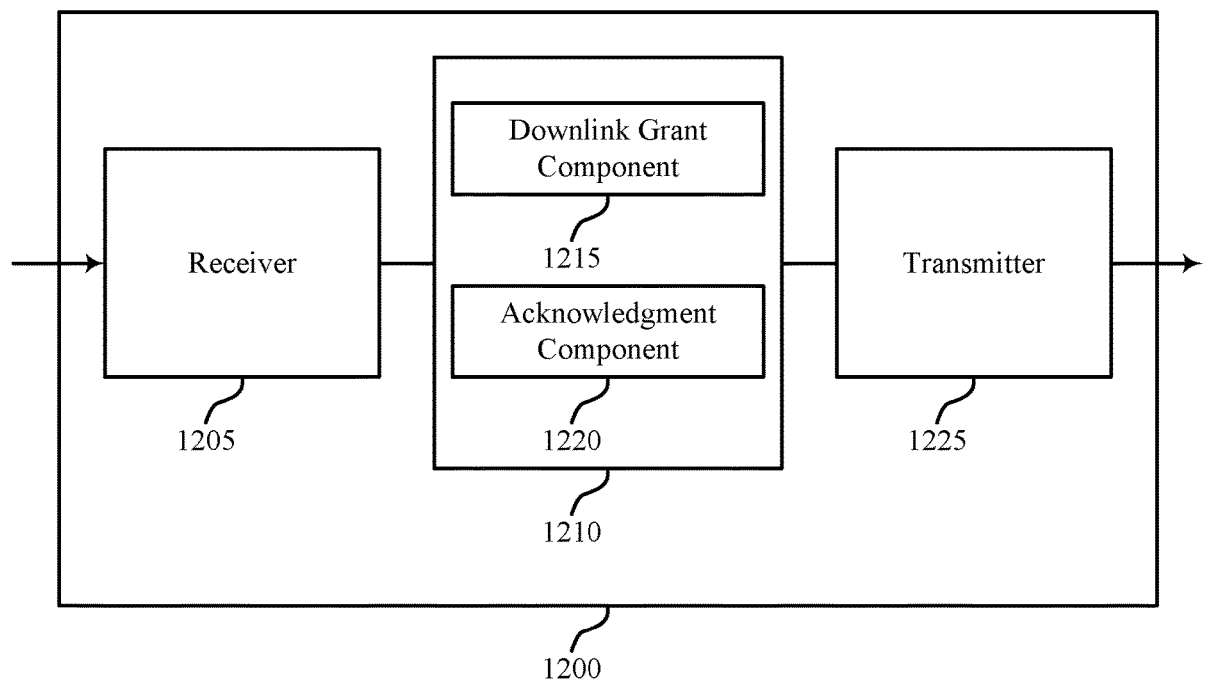

FIG. 12 shows a block diagram of a wireless device 1200 that supports signature based integrity checking for downlink grant error protection in eCCs in accordance with various aspects of the present disclosure. Wireless device 1200 may be an example of aspects of a wireless device 1100 or a base station 105 described with reference to FIGS. 1, 2 and 11. Wireless device 1200 may include receiver 1205, base station integrity check manager 1210 and transmitter 1225. Wireless device 1200 may also include a processor. Each of these components may be in communication with each other.

The receiver 1205 may receive information which may be passed on to other components of the device. The receiver 1205 may also perform the functions described with reference to the receiver 1105 of FIG. 11. The receiver 1205 may be an example of aspects of the transceiver 1425 described with reference to FIG. 14.

The base station integrity check manager 1210 may be an example of aspects of base station integrity check manager 1110 described with reference to FIG. 11. The base station integrity check manager 1210 may include downlink grant component 1215 and acknowledgment component 1220. The base station integrity check manager 1210 may be an example of aspects of the base station integrity check manager 1405 described with reference to FIG. 14.

The downlink grant component 1215 may transmit a downlink grant based on the first acknowledgment message, where the downlink grant includes the first signature, and transmit a subsequent downlink grant including the first signature based on the determination.

The acknowledgment component 1220 may receive a first acknowledgment message, where the first acknowledgment message includes a first signature, receive a second acknowledgment message including a second signature in response to the data message, and determine that a second acknowledgment message corresponding to the downlink grant has not been received.

The transmitter 1225 may transmit signals received from other components of wireless device 1200. In some examples, the transmitter 1225 may be collocated with a receiver in a transceiver module. For example, the transmitter 1225 may be an example of aspects of the transceiver 1425 described with reference to FIG. 14. The transmitter 1225 may utilize a single antenna, or it may utilize a plurality of antennas.

Figure 13:
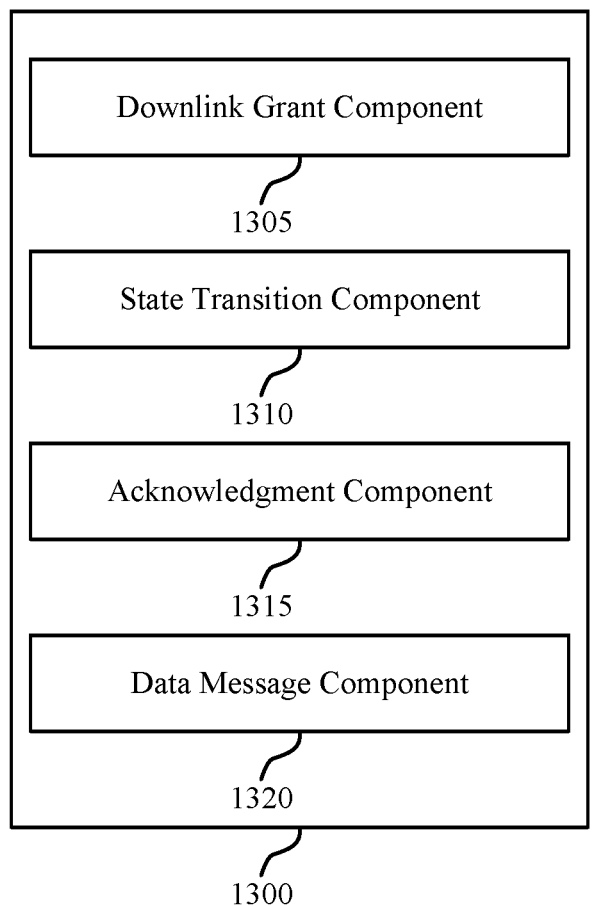

FIG. 13 shows a block diagram of a base station integrity check manager 1300 which may be an example of the corresponding component of wireless device 1100 or wireless device 1200. That is, base station integrity check manager 1300 may be an example of aspects of base station integrity check manager 1110 or base station integrity check manager 1210 described with reference to FIGS. 11 and 12. The base station integrity check manager 1300 may also be an example of aspects of the base station integrity check manager 1405 described with reference to FIG. 14.

The base station integrity check manager 1300 may include downlink grant component 1305, state transition component 1310, acknowledgment component 1315 and data message component 1320. Each of these modules may communicate, directly or indirectly, with one another (e.g., via one or more buses).

The downlink grant component 1305 may transmit a downlink grant based on the first acknowledgment message, where the downlink grant includes the first signature, and transmit a subsequent downlink grant including the first signature based on the determination. The state transition component 1310 may transition from a HARQ idle state to a HARQ pending state following the transmission of the downlink grant, and transition from the HARQ pending state to the HARQ idle state following the receipt of the first acknowledgment message.

The acknowledgment component 1315 may receive a first acknowledgment message, where the first acknowledgment message includes a first signature, receive a second acknowledgment message including a second signature in response to the data message, and determine that a second acknowledgment message corresponding to the downlink grant has not been received. The data message component 1320 may transmit a data message using resources in the downlink grant.

Figure 14:
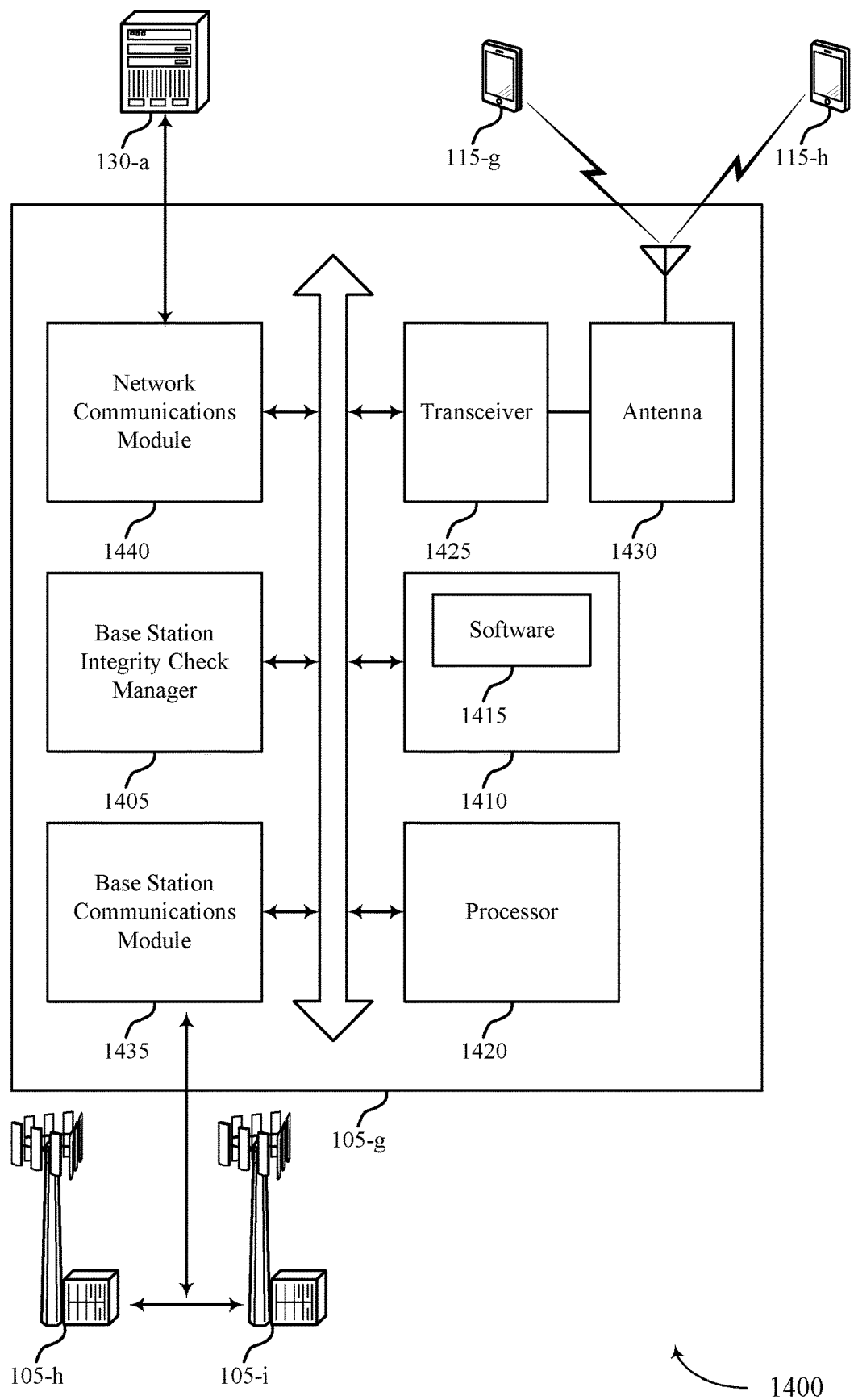
FIG. 14 illustrates a block diagram of a system including a base station that supports signature based integrity checking for downlink grant error protection in eCCs in accordance with aspects of the present disclosure.

FIG. 14 shows a diagram of a wireless system 1400 including a device configured for operation in a system that supports signature based integrity checking for downlink grant error protection in eCCs in accordance with various aspects of the present disclosure. For example, wireless system 1400 may include base station 105-g, which may be an example of a wireless device 1100, a wireless device 1200, or a base station 105 as described with reference to FIGS. 1, 2 and 11 through 13. Base station 105-g may also include components for bi-directional voice and data communications including components for transmitting communications and components for receiving communications. For example, base station 105-g may communicate bi-directionally with one or more UEs 115.

Base station 105-g may also include base station integrity check manager 1405, memory 1410, processor 1420, transceiver 1425, antenna 1430, base station communications module 1435 and network communications module 1440. Each of these modules may communicate, directly or indirectly, with one another (e.g., via one or more buses). The base station integrity check manager 1405 may be an example of a base station integrity check manager as described with reference to FIGS. 11 through 13.

The memory 1410 may include RAM and ROM. The memory 1410 may store computer-readable, computer-executable software including instructions that, when executed, cause the processor to perform various functions described herein (e.g., signature based integrity checking for downlink grant error protection in eCCs, etc.). In some cases, the software 1415 may not be directly executable by the processor but may cause a computer (e.g., when compiled and executed) to perform functions described herein. The processor 1420 may include an intelligent hardware device, (e.g., a CPU, a microcontroller, an ASIC, etc.)

The transceiver 1425 may communicate bi-directionally, via one or more antennas, wired, or wireless links, with one or more networks, as described above. For example, the transceiver 1425 may communicate bi-directionally with a base station 105 or a UE 115. The transceiver 1425 may also include a modem to modulate the packets and provide the modulated packets to the antennas for transmission, and to demodulate packets received from the antennas. In some cases, the wireless device may include a single antenna 1430. However, in some cases the device may have more than one antenna 1430, which may be capable of concurrently transmitting or receiving multiple wireless transmissions.

The base station communications module 1435 may manage communications with other base station 105, and may include a controller or scheduler for controlling communications with UEs 115 in cooperation with other base stations 105. For example, the base station communications module 1435 may coordinate scheduling for transmissions to UEs 115 for various interference mitigation techniques such as beamforming or joint transmission. In some examples, base station communications module 1435 may provide an X2 interface within an LTE/LTE-A wireless communication network technology to provide communication between base stations 105.

The network communications module 1440 may manage communications with the core network (e.g., via one or more wired backhaul links). For example, the network communications module 1440 may manage the transfer of data communications for client devices, such as one or more UEs 115.

Figure 15:
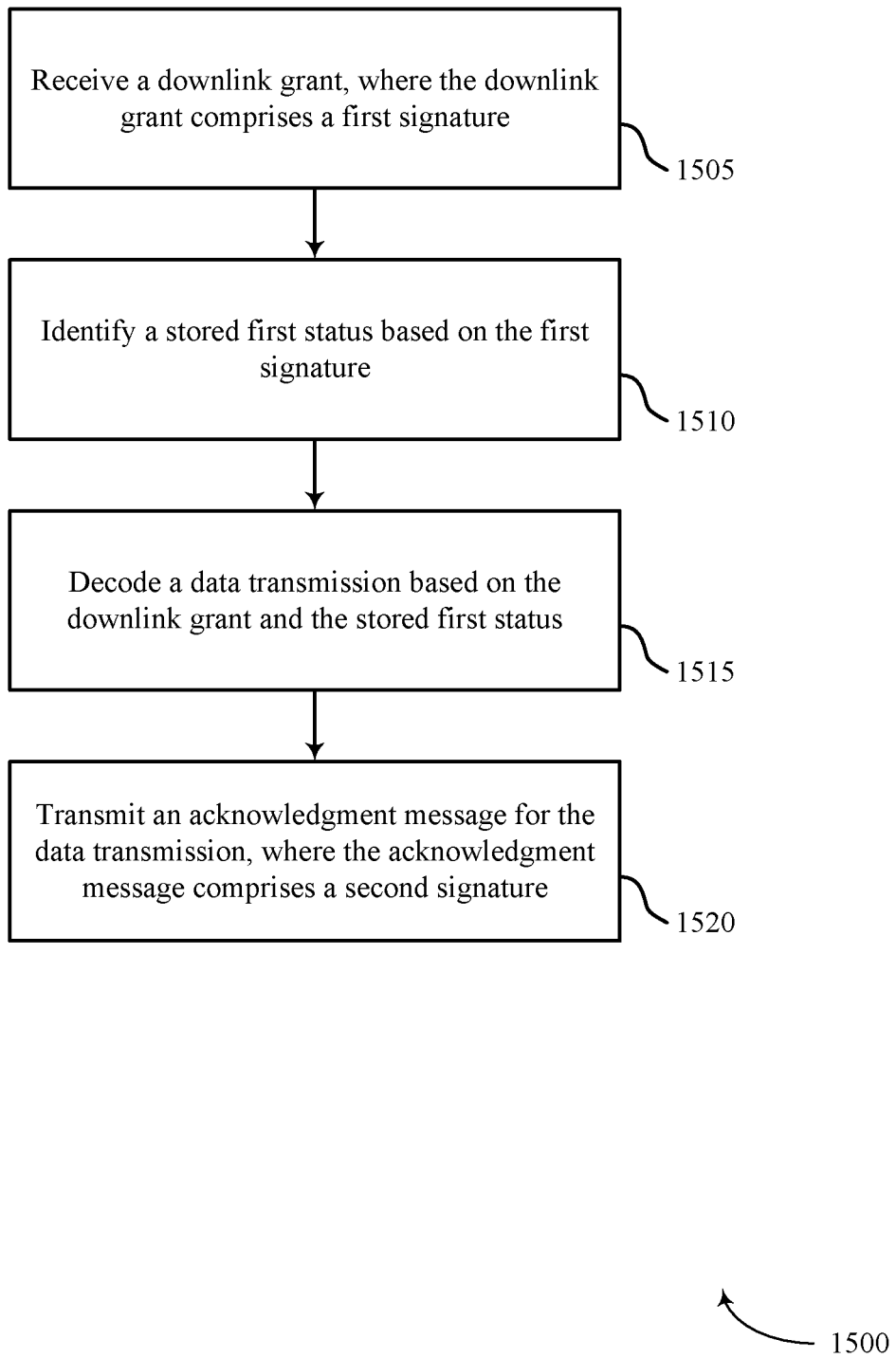
FIGS. 15 through 20 illustrate methods for signature based integrity checking for downlink grant error protection in eCCs in accordance with aspects of the present disclosure.

FIG. 15 shows a flowchart illustrating a method 1500 in a system that supports signature based integrity checking for downlink grant error protection in eCCs in accordance with various aspects of the present disclosure. The operations of method 1500 may be implemented by a device such as a UE 115 or its components as described with reference to FIGS. 1 and 2. For example, the operations of method 1500 may be performed by the integrity check manager as described herein. In some examples, the UE 115 may execute a set of codes to control the functional elements of the device to perform the functions described below. Additionally or alternatively, the UE 115 may perform aspects of the functions described below using special-purpose hardware.

At block 1505, the UE 115 may receive a downlink grant, where the downlink grant includes a first signature as described above with reference to FIGS. 2 through 6. In certain examples, the operations of block 1505 may be performed by the downlink grant component as described with reference to FIGS. 8 and 9.

At block 1510, the UE 115 may identify a stored first status based on the first signature as described above with reference to FIGS. 2 through 6. In certain examples, the operations of block 1510 may be performed by the status lookup component as described with reference to FIGS. 8 and 9.

At block 1515, the UE 115 may decode a data transmission based on the downlink grant and the stored first status as described above with reference to FIGS. 2 through 6. In certain examples, the operations of block 1515 may be performed by the decoder as described with reference to FIGS. 8 and 9.

At block 1520, the UE 115 may transmit an acknowledgment message for the data transmission, where the acknowledgment message includes a second signature as described above with reference to FIGS. 2 through 6. In certain examples, the operations of block 1520 may be performed by the acknowledgment component as described with reference to FIGS. 8 and 9.

Figure 16:
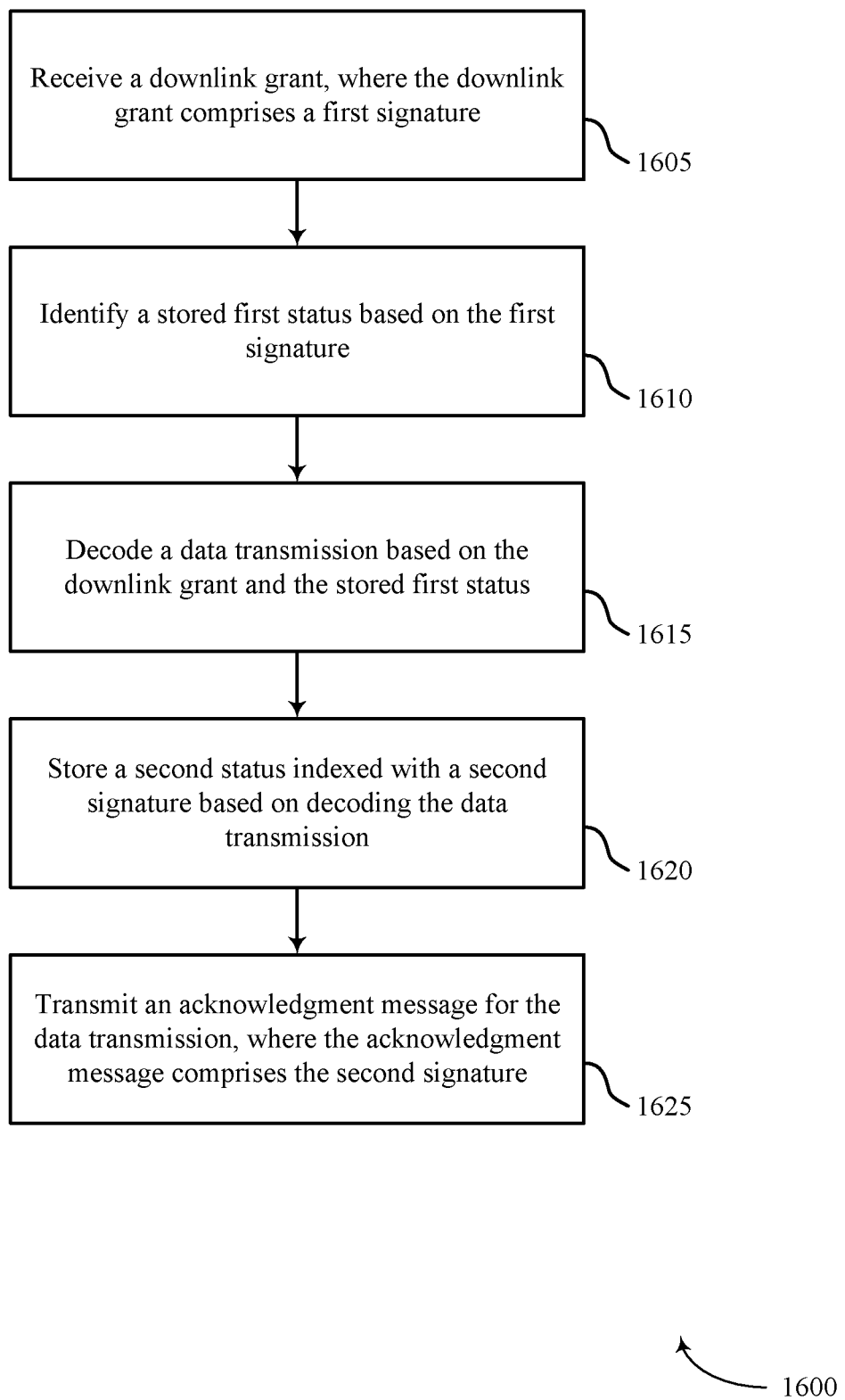

FIG. 16 shows a flowchart illustrating a method 1600 in a system that supports signature based integrity checking for downlink grant error protection in eCCs in accordance with various aspects of the present disclosure. The operations of method 1600 may be implemented by a device such as a UE 115 or its components as described with reference to FIGS. 1 and 2. For example, the operations of method 1600 may be performed by the integrity check manager as described herein. In some examples, the UE 115 may execute a set of codes to control the functional elements of the device to perform the functions described below. Additionally or alternatively, the UE 115 may perform aspects of the functions described below using special-purpose hardware.

At block 1605, the UE 115 may receive a downlink grant, where the downlink grant includes a first signature as described above with reference to FIGS. 2 through 6. In certain examples, the operations of block 1605 may be performed by the downlink grant component as described with reference to FIGS. 8 and 9.

At block 1610, the UE 115 may identify a stored first status based on the first signature as described above with reference to FIGS. 2 through 6. In certain examples, the operations of block 1610 may be performed by the status lookup component as described with reference to FIGS. 8 and 9.

At block 1615, the UE 115 may decode a data transmission based on the downlink grant and the stored first status as described above with reference to FIGS. 2 through 6. In certain examples, the operations of block 1615 may be performed by the decoder as described with reference to FIGS. 8 and 9.

At block 1620, the UE 115 may store a second status indexed with a second signature based on decoding the data transmission as described above with reference to FIGS. 2 through 6. In certain examples, the operations of block 1620 may be performed by the status storage component as described with reference to FIGS. 8 and 9.

At block 1625, the UE 115 may transmit an acknowledgment message for the data transmission, where the acknowledgment message includes the second signature as described above with reference to FIGS. 2 through 6. In certain examples, the operations of block 1625 may be performed by the acknowledgment component as described with reference to FIGS. 8 and 9.

Figure 17:
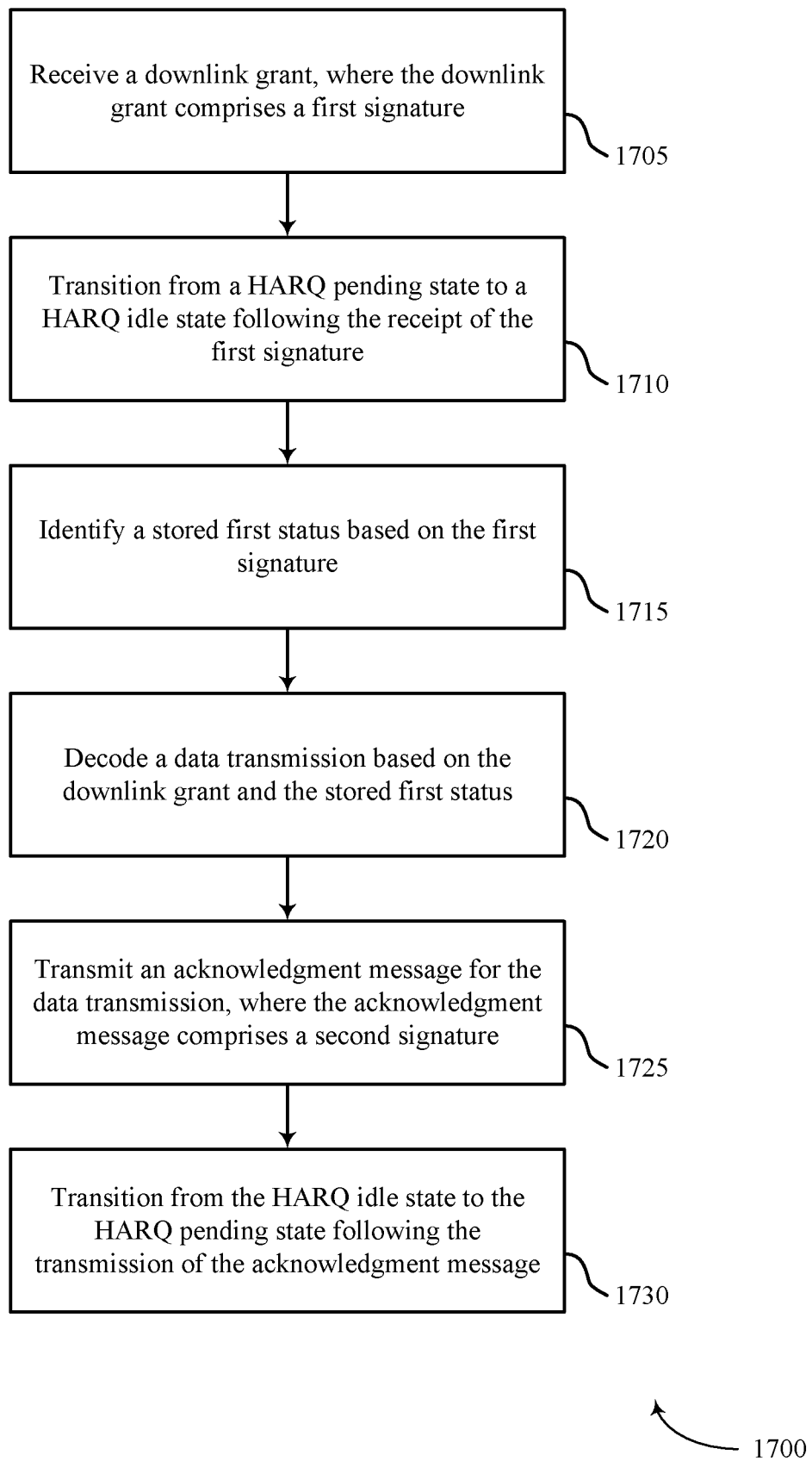

FIG. 17 shows a flowchart illustrating a method 1700 in a system that supports signature based integrity checking for downlink grant error protection in eCCs in accordance with various aspects of the present disclosure. The operations of method 1700 may be implemented by a device such as a UE 115 or its components as described with reference to FIGS. 1 and 2. For example, the operations of method 1700 may be performed by the integrity check manager as described herein. In some examples, the UE 115 may execute a set of codes to control the functional elements of the device to perform the functions described below. Additionally or alternatively, the UE 115 may perform aspects of the functions described below using special-purpose hardware.

At block 1705, the UE 115 may receive a downlink grant, where the downlink grant includes a first signature as described above with reference to FIGS. 2 through 6. In certain examples, the operations of block 1705 may be performed by the downlink grant component as described with reference to FIGS. 8 and 9.

At block 1710, the UE 115 may transition from the HARQ pending state to the HARQ idle state following the receipt of the first signature as described above with reference to FIGS. 2 through 6. In certain examples, the operations of block 1710 may be performed by the state transition component as described with reference to FIGS. 8 and 9.

At block 1715, the UE 115 may identify a stored first status based on the first signature as described above with reference to FIGS. 2 through 6. In certain examples, the operations of block 1715 may be performed by the status lookup component as described with reference to FIGS. 8 and 9.

At block 1720, the UE 115 may decode a data transmission based on the downlink grant and the stored first status as described above with reference to FIGS. 2 through 6. In certain examples, the operations of block 1720 may be performed by the decoder as described with reference to FIGS. 8 and 9.

At block 1725, the UE 115 may transmit an acknowledgment message for the data transmission, where the acknowledgment message includes a second signature as described above with reference to FIGS. 2 through 6. In certain examples, the operations of block 1725 may be performed by the acknowledgment component as described with reference to FIGS. 8 and 9.

At block 1730, the UE 115 may transition from a HARQ idle state to a HARQ pending state following the transmission of the acknowledgment message as described above with reference to FIGS. 2 through 6. In certain examples, the operations of block 1730 may be performed by the state transition component as described with reference to FIGS. 8 and 9.

Figure 18:
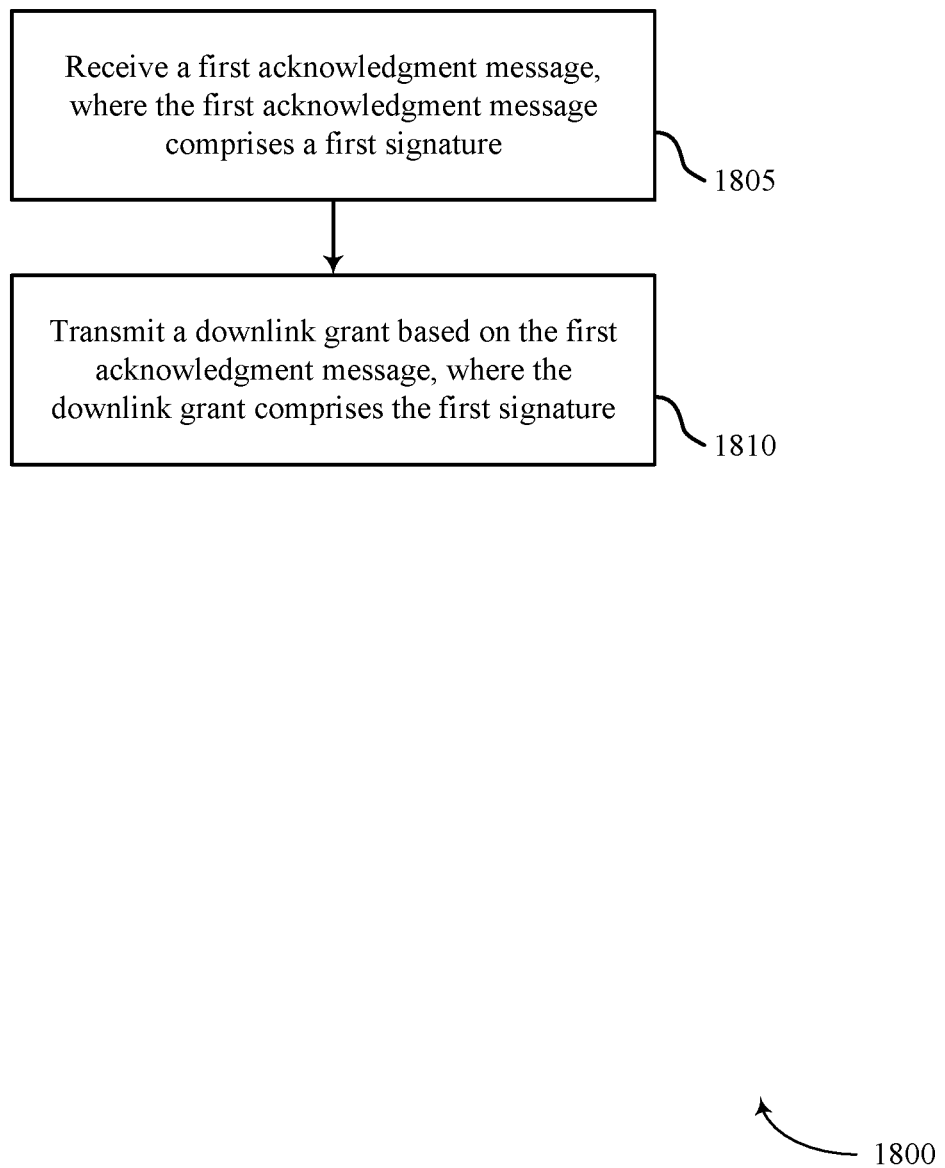

FIG. 18 shows a flowchart illustrating a method 1800 in a system that supports signature based integrity checking for downlink grant error protection in eCCs in accordance with various aspects of the present disclosure. The operations of method 1800 may be implemented by a device such as a base station 105 or its components as described with reference to FIGS. 1 and 2. For example, the operations of method 1800 may be performed by the base station integrity check manager as described herein. In some examples, the base station 105 may execute a set of codes to control the functional elements of the device to perform the functions described below. Additionally or alternatively, the base station 105 may perform aspects of the functions described below using special-purpose hardware.

At block 1805, the base station 105 may receive a first acknowledgment message, where the first acknowledgment message includes a first signature as described above with reference to FIGS. 2 through 6. In certain examples, the operations of block 1805 may be performed by the acknowledgment component as described with reference to FIGS. 12 and 13.

At block 1810, the base station 105 may transmit a downlink grant based on the first acknowledgment message, where the downlink grant includes the first signature as described above with reference to FIGS. 2 through 6. In certain examples, the operations of block 1810 may be performed by the downlink grant component as described with reference to FIGS. 12 and 13.

Figure 19:
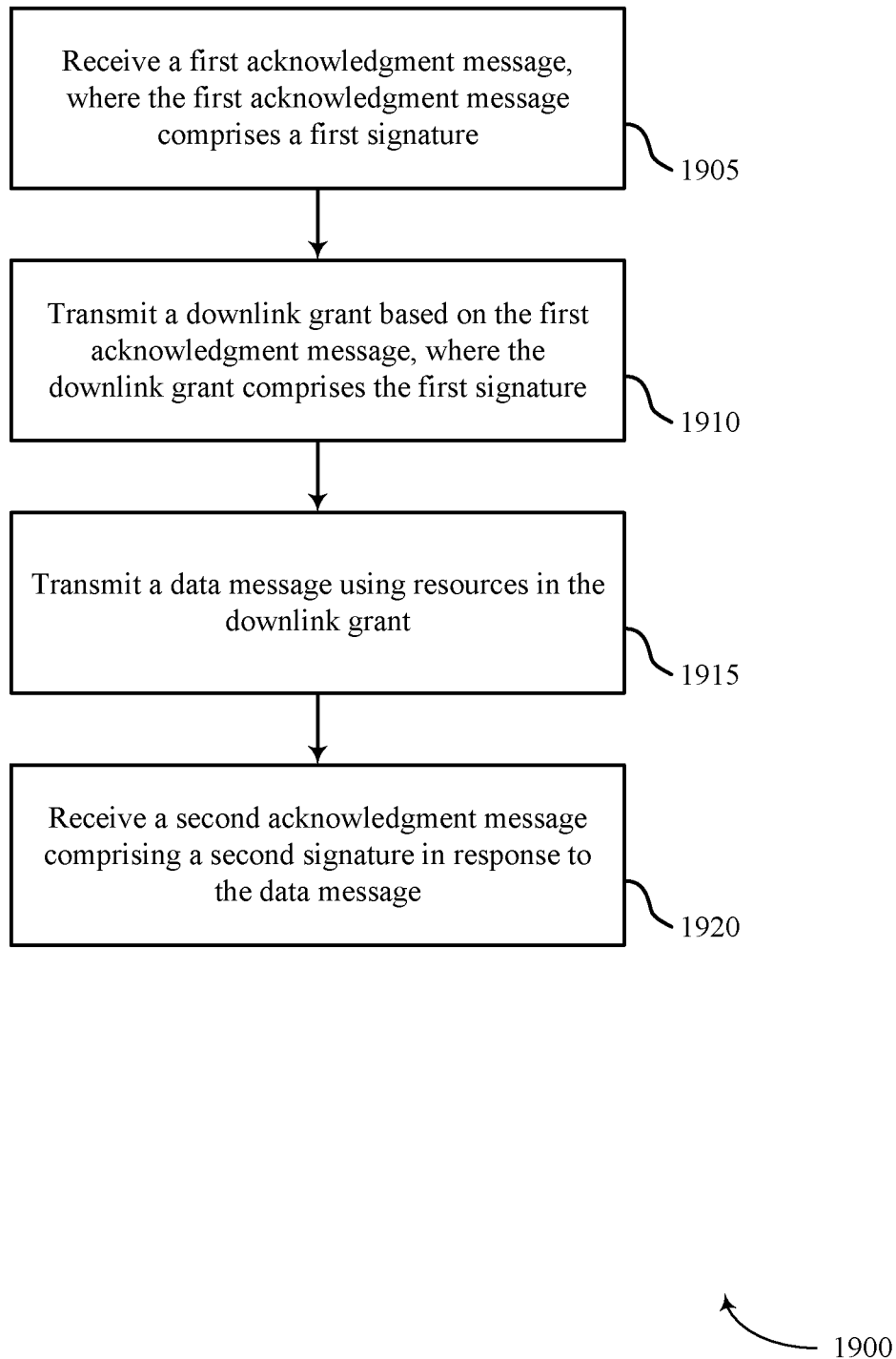

FIG. 19 shows a flowchart illustrating a method 1900 in a system that supports signature based integrity checking for downlink grant error protection in eCCs in accordance with various aspects of the present disclosure. The operations of method 1900 may be implemented by a device such as a base station 105 or its components as described with reference to FIGS. 1 and 2. For example, the operations of method 1900 may be performed by the base station integrity check manager as described herein. In some examples, the base station 105 may execute a set of codes to control the functional elements of the device to perform the functions described below. Additionally or alternatively, the base station 105 may perform aspects of the functions described below using special-purpose hardware.

At block 1905, the base station 105 may receive a first acknowledgment message, where the first acknowledgment message includes a first signature as described above with reference to FIGS. 2 through 6. In certain examples, the operations of block 1905 may be performed by the acknowledgment component as described with reference to FIGS. 12 and 13.

At block 1910, the base station 105 may transmit a downlink grant based on the first acknowledgment message, where the downlink grant includes the first signature as described above with reference to FIGS. 2 through 6. In certain examples, the operations of block 1910 may be performed by the downlink grant component as described with reference to FIGS. 12 and 13.

At block 1915, the base station 105 may transmit a data message using resources in the downlink grant as described above with reference to FIGS. 2 through 6. In certain examples, the operations of block 1915 may be performed by the data message component as described with reference to FIGS. 12 and 13.

At block 1920, the base station 105 may receive a second acknowledgment message including a second signature in response to the data message as described above with reference to FIGS. 2 through 6. In certain examples, the operations of block 1920 may be performed by the acknowledgment component as described with reference to FIGS. 12 and 13.

Figure 20:
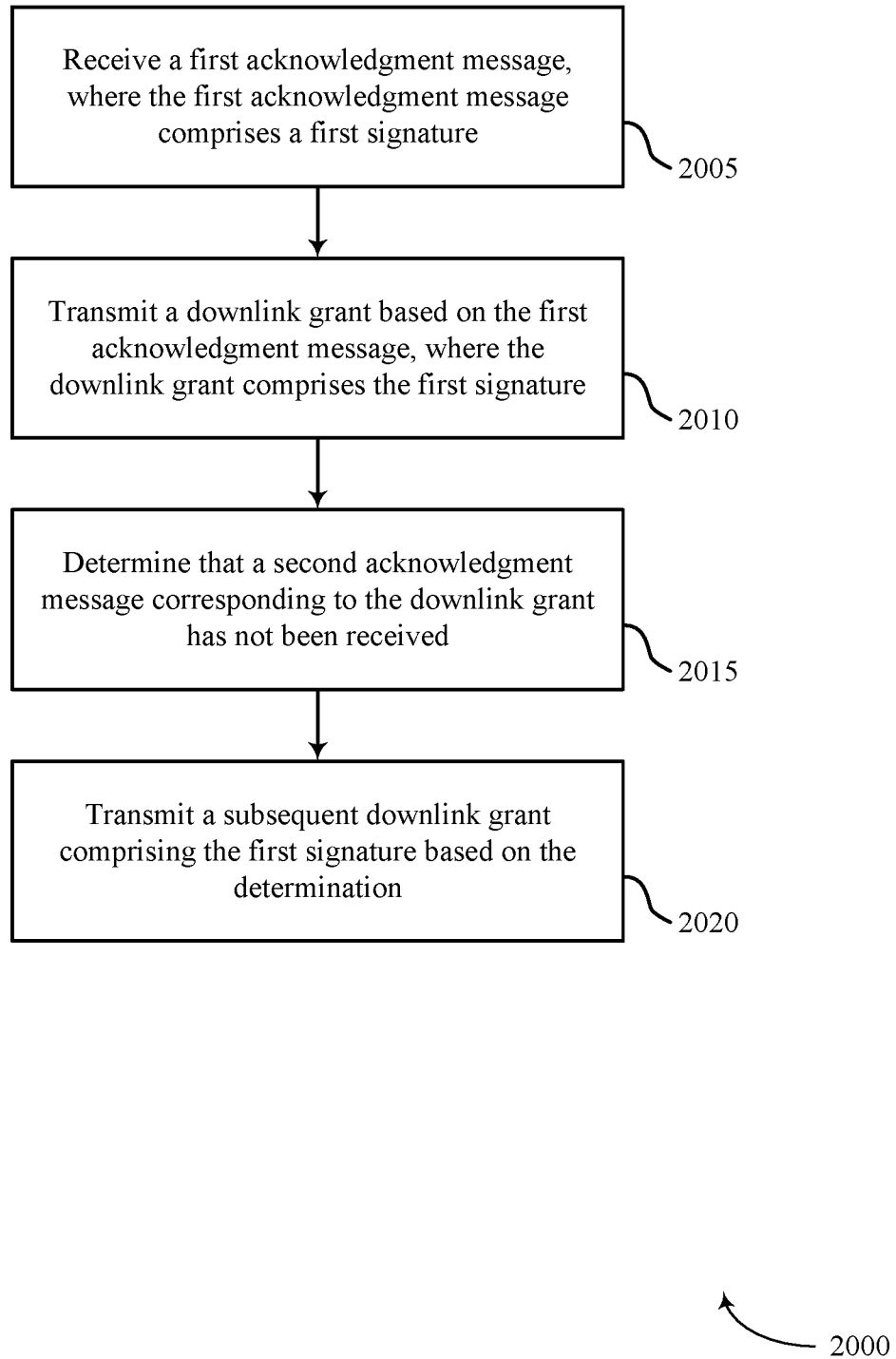

FIG. 20 shows a flowchart illustrating a method 2000 in a system that supports signature based integrity checking for downlink grant error protection in eCCs in accordance with various aspects of the present disclosure. The operations of method 2000 may be implemented by a device such as a base station 105 or its components as described with reference to FIGS. 1 and 2. For example, the operations of method 2000 may be performed by the base station integrity check manager as described herein. In some examples, the base station 105 may execute a set of codes to control the functional elements of the device to perform the functions described below. Additionally or alternatively, the base station 105 may perform aspects of the functions described below using special-purpose hardware.

At block 2005, the base station 105 may receive a first acknowledgment message, where the first acknowledgment message includes a first signature as described above with reference to FIGS. 2 through 6. In certain examples, the operations of block 2005 may be performed by the acknowledgment component as described with reference to FIGS. 12 and 13.

At block 2010, the base station 105 may transmit a downlink grant based on the first acknowledgment message, where the downlink grant includes the first signature as described above with reference to FIGS. 2 through 6. In certain examples, the operations of block 2010 may be performed by the downlink grant component as described with reference to FIGS. 12 and 13.

At block 2015, the base station 105 may determine that a second acknowledgment message corresponding to the downlink grant has not been received as described above with reference to FIGS. 2 through 6. In certain examples, the operations of block 2015 may be performed by the acknowledgment component as described with reference to FIGS. 12 and 13.

At block 2020, the base station 105 may transmit a subsequent downlink grant including the first signature based on the determination as described above with reference to FIGS. 2 through 6. In certain examples, the operations of block 2020 may be performed by the downlink grant component as described with reference to FIGS. 12 and 13.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for signature based integrity checking for downlink grant error protection in eCCs.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile communications (GSM). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (UMTS). 3GPP LTE and LTE-advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., wireless communication links 125 of FIG. 1) may transmit bidirectional communications using frequency division duplex (FDD) (e.g., using paired spectrum resources) or TDD operation (e.g., using unpaired spectrum resources). Frame structures may be defined for FDD (e.g., frame structure type 1) and TDD (e.g., frame structure type 2).

Thus, aspects of the disclosure may provide for signature based integrity checking for downlink grant error protection in eCCs. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication comprising:
receiving a downlink grant, wherein the downlink grant comprises a first bit field that includes a first signature;
identifying a stored first status based at least in part on the first signature;
decoding a data transmission based at least in part on the downlink grant and the stored first status; and
transmitting an acknowledgment message for the data transmission, wherein the acknowledgment message comprises a second bit field that includes a second signature that is a function of the first signature and different from the first signature.

2. The method of claim 1, further comprising:
storing a second status indexed with the second signature based at least in part on decoding the data transmission.

3. The method of claim 2, wherein the first status is stored in a first page of memory and the second status is stored in a second page of memory.

4. The method of claim 1, further comprising:
transitioning from a hybrid automatic repeat request (HARQ) idle state to a HARQ pending state following the transmission of the acknowledgment message.

5. The method of claim 4, further comprising:
transitioning from the HARQ pending state to the HARQ idle state following the receipt of the first signature.

6. The method of claim 1, wherein the first signature and the second signature are different values, and wherein the second signature is an increment of the first signature.

7. The method of claim 1, wherein the stored first status comprises one or more of a transport block (TB) structure, a code block (CB) identifier, or log likelihood ratio (LLR) buffer contents, wherein the data transmission is decoded based at least in part on the one or more of the TB structure, the CB identifier, or the LLR buffer contents for decoding the data transmission.

8. A method of wireless communication comprising: receiving a first acknowledgment message, wherein the first acknowledgment message comprises feedback information and a first bit field that includes a first signature; and transmitting a downlink grant based at least in part on the first acknowledgment message, wherein the downlink grant comprises a second bit field that includes the first signature; transmitting a data message using resources in the downlink grant; and receiving a second acknowledgment message comprising a second signature in response to the data message, wherein the second signature is a function of the first signature and different from the first signature.

9. The method of claim 8, further comprising:
  determining that a second acknowledgment message corresponding to the downlink grant has not been received; and
  transmitting a subsequent downlink grant comprising the first signature based at least in part on the determination.

10. The method of claim 8, further comprising:
  transitioning from a hybrid automatic repeat request (HARQ) idle state to a HARQ pending state following the transmission of the downlink grant.

11. The method of claim 10, further comprising:
  transitioning from the HARQ pending state to the HARQ idle state following the receipt of the first acknowledgment message.

12. An apparatus for wireless communication, comprising:
  a processor;
  memory in communication with the processor; and
  instructions stored in the memory and operable, when executed by the processor, to cause the apparatus to:
  receive a downlink grant, wherein the downlink grant comprises a first bit field that includes a first signature;
  identify a stored first status based at least in part on the first signature;
  decode a data transmission based at least in part on the downlink grant and the stored first status; and
  transmit an acknowledgment message for the data transmission, wherein the acknowledgment message comprises a second bit field that includes a second signature that is a function of the first signature and different from the first signature.

13. The apparatus of claim 12, wherein the instructions are operable to cause the processor to:
  store a second status indexed with the second signature based at least in part on decoding the data transmission.

14. The apparatus of claim 13, wherein the first status is stored in a first page of memory and the second status is stored in a second page of memory.

15. The apparatus of claim 12, wherein the instructions are operable to cause the processor to:
  transition from a hybrid automatic repeat request (HARQ) idle state to a HARQ pending state following the transmission of the acknowledgment message.

16. The apparatus of claim 15, wherein the instructions are operable to cause the processor to:
  transition from the HARQ pending state to the HARQ idle state following the receipt of the first signature.

17. The apparatus of claim 12, wherein the first signature and the second signature are different values, and wherein the second signature is an increment of the first signature.

18. The apparatus of claim 12, wherein the stored first status comprises one or more of a transport block (TB) structure, a code block (CB) identifier, or log likelihood ratio (LLR) buffer contents, wherein the data transmission is decoded based at least in part on the one or more of the TB structure, the CB identifier, or the LLR buffer contents for decoding the data transmission.

19. An apparatus for wireless communication, comprising: a processor; memory in communication with the processor; and instructions stored in the memory and operable, when executed by the processor, to cause the apparatus to: receive a first acknowledgment message, wherein the first acknowledgment message comprises feedback information and a first bit field that includes a first signature; and transmit a downlink grant based at least in part on the first acknowledgment message, wherein the downlink grant comprises a second bit field that includes the first signature, wherein the instructions are operable to cause the processor to: transmit a data message using resources in the downlink grant; and receive a second acknowledgment message comprising a second signature in response to the data message, wherein the second signature is a function of the first signature and different from the first signature.

20. The apparatus of claim 19, wherein the instructions are operable to cause the processor to:
  determine that a second acknowledgment message corresponding to the downlink grant has not been received; and
  transmit a subsequent downlink grant comprising the first signature based at least in part on the determination.

21. The apparatus of claim 19, wherein the instructions are operable to cause the processor to:
  transition from a hybrid automatic repeat request (HARQ) idle state to a HARQ pending state following the transmission of the downlink grant.

22. The apparatus of claim 21, wherein the instructions are operable to cause the processor to:
  transition from the HARQ pending state to the HARQ idle state following the receipt of the first acknowledgment message.

* * * * *